May 22, 1923.
G. W. GWINN
1,456,307
MACHINE FOR APPLYING STAMPS, LABELS, OR SEALING STRIPS TO PACKAGES
Filed May 20, 1914     15 Sheets-Sheet 1
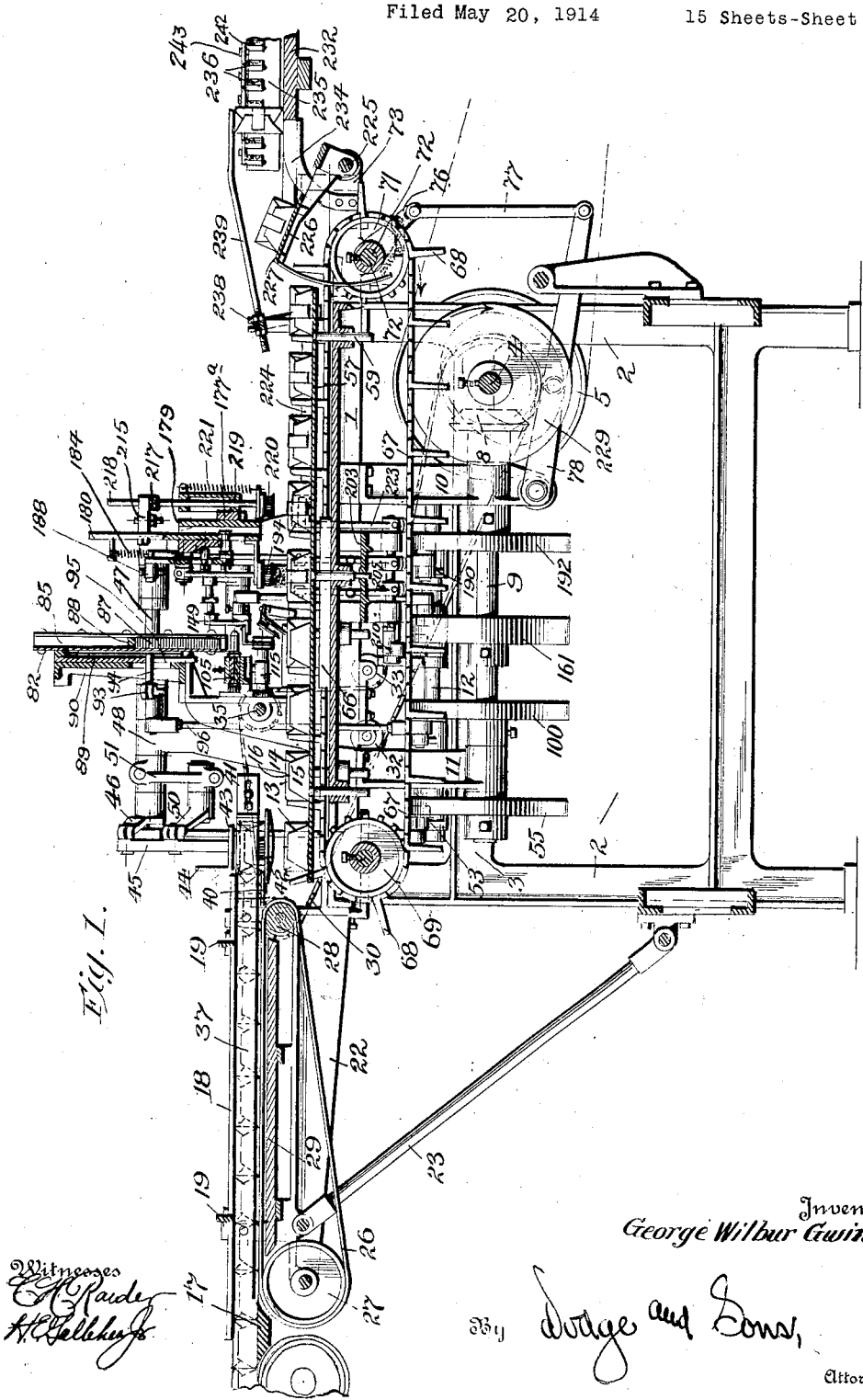
Inventor
George Wilbur Gwinn,
By Dodge and Sons,
Attorneys
Witnesses

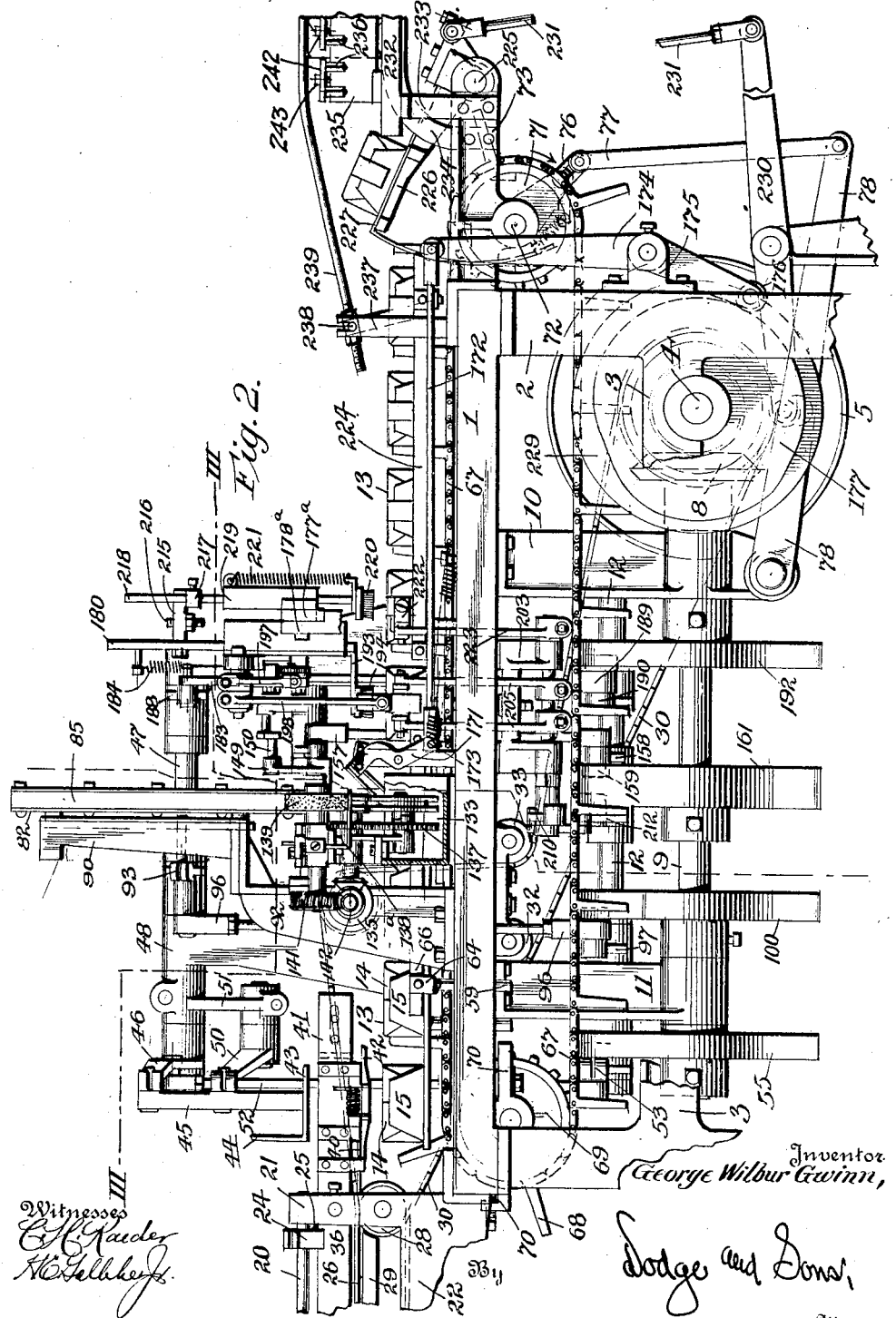

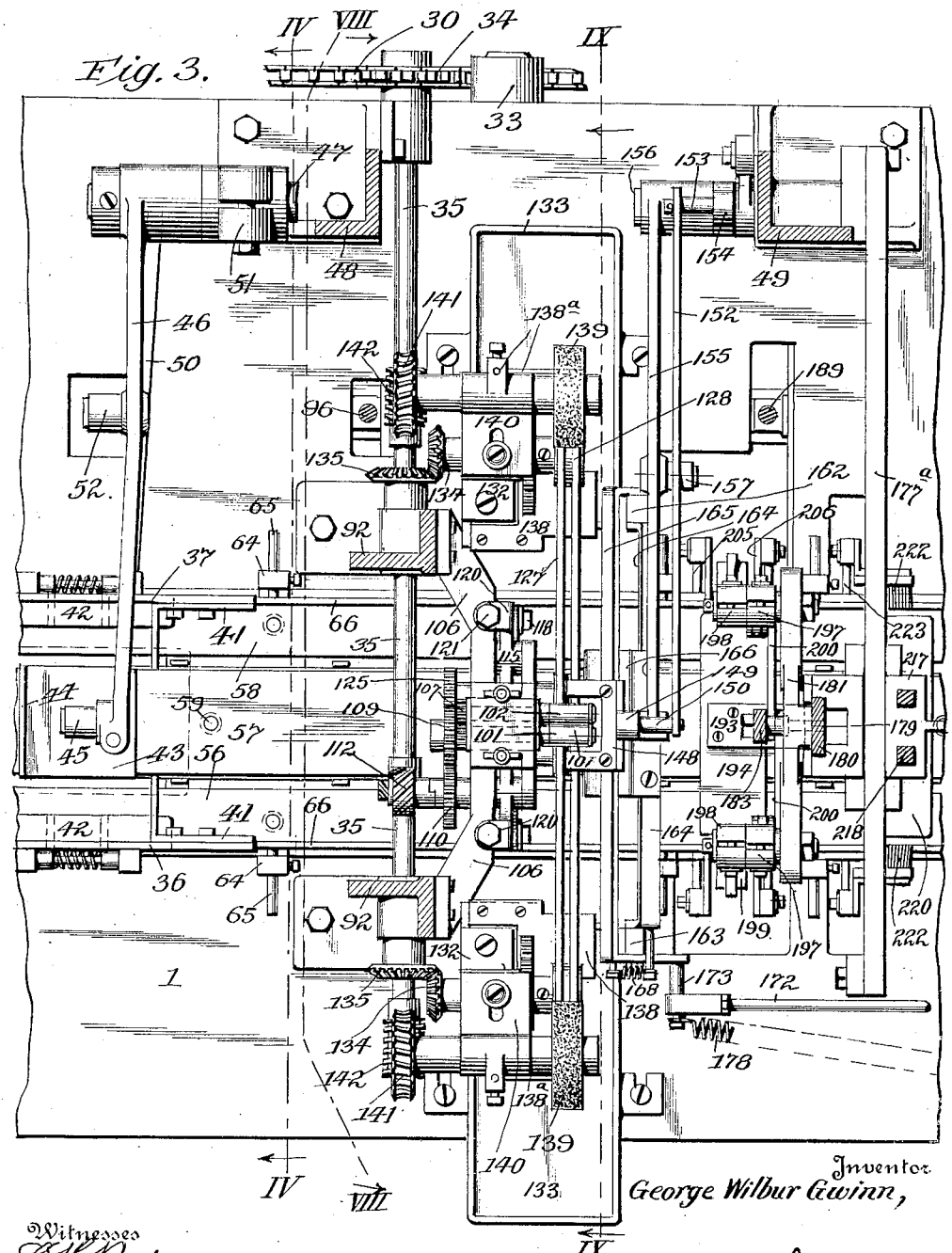

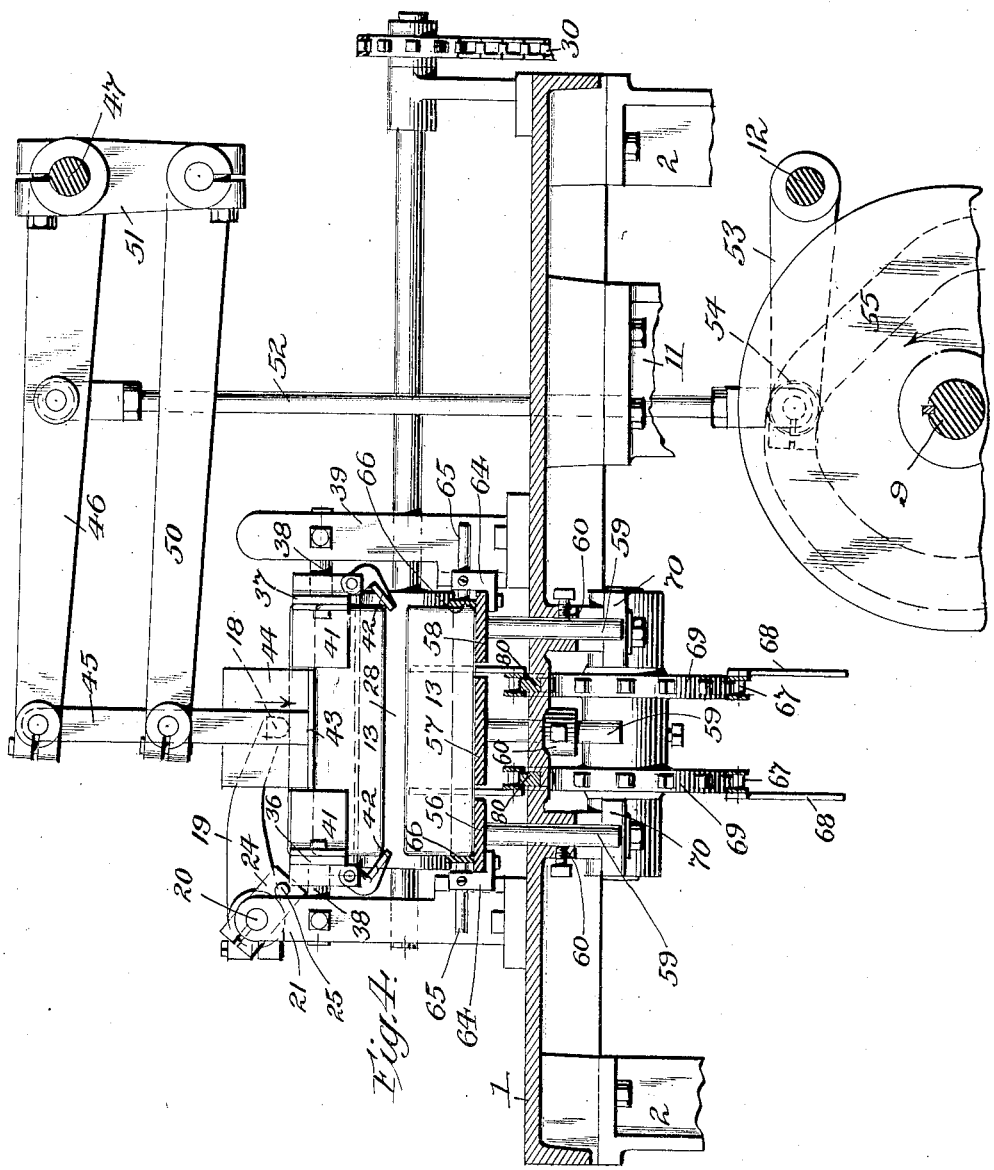

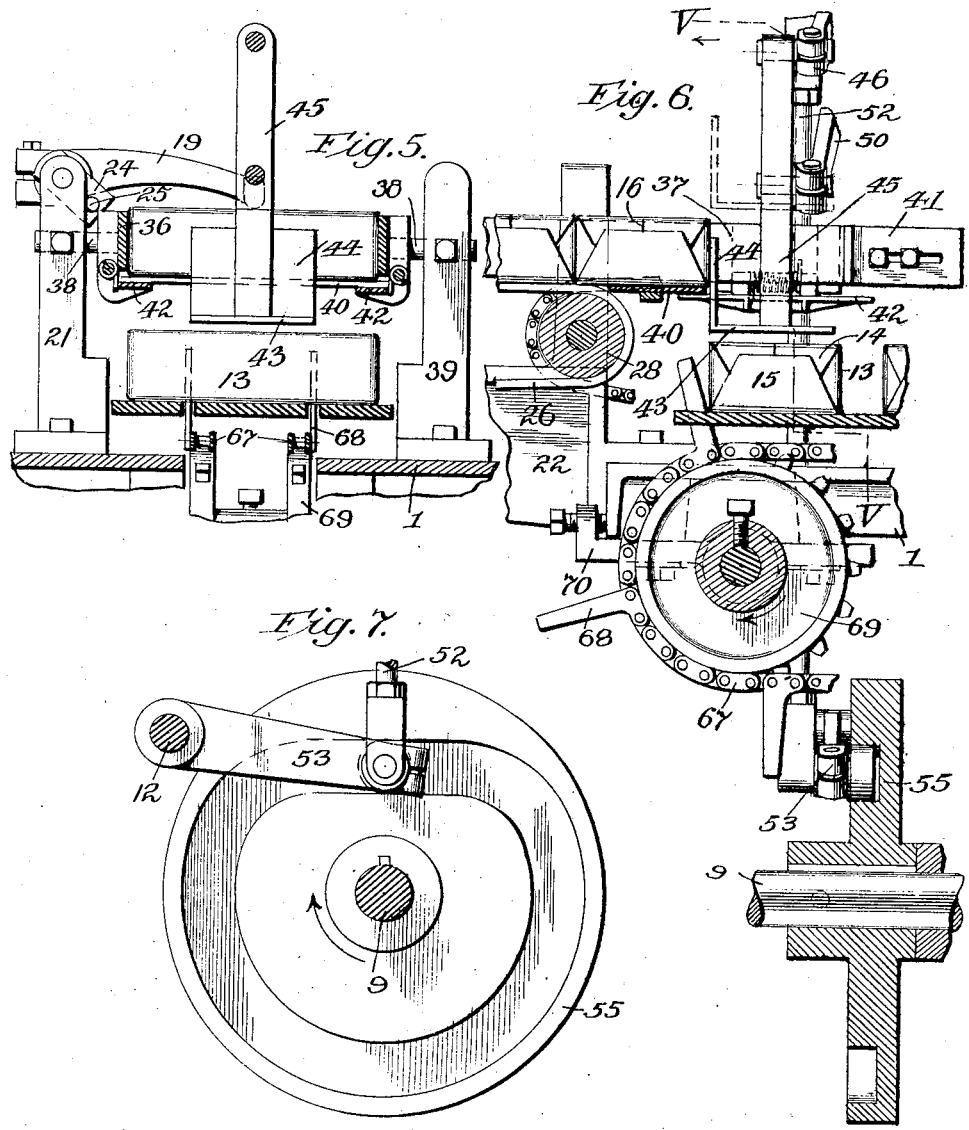

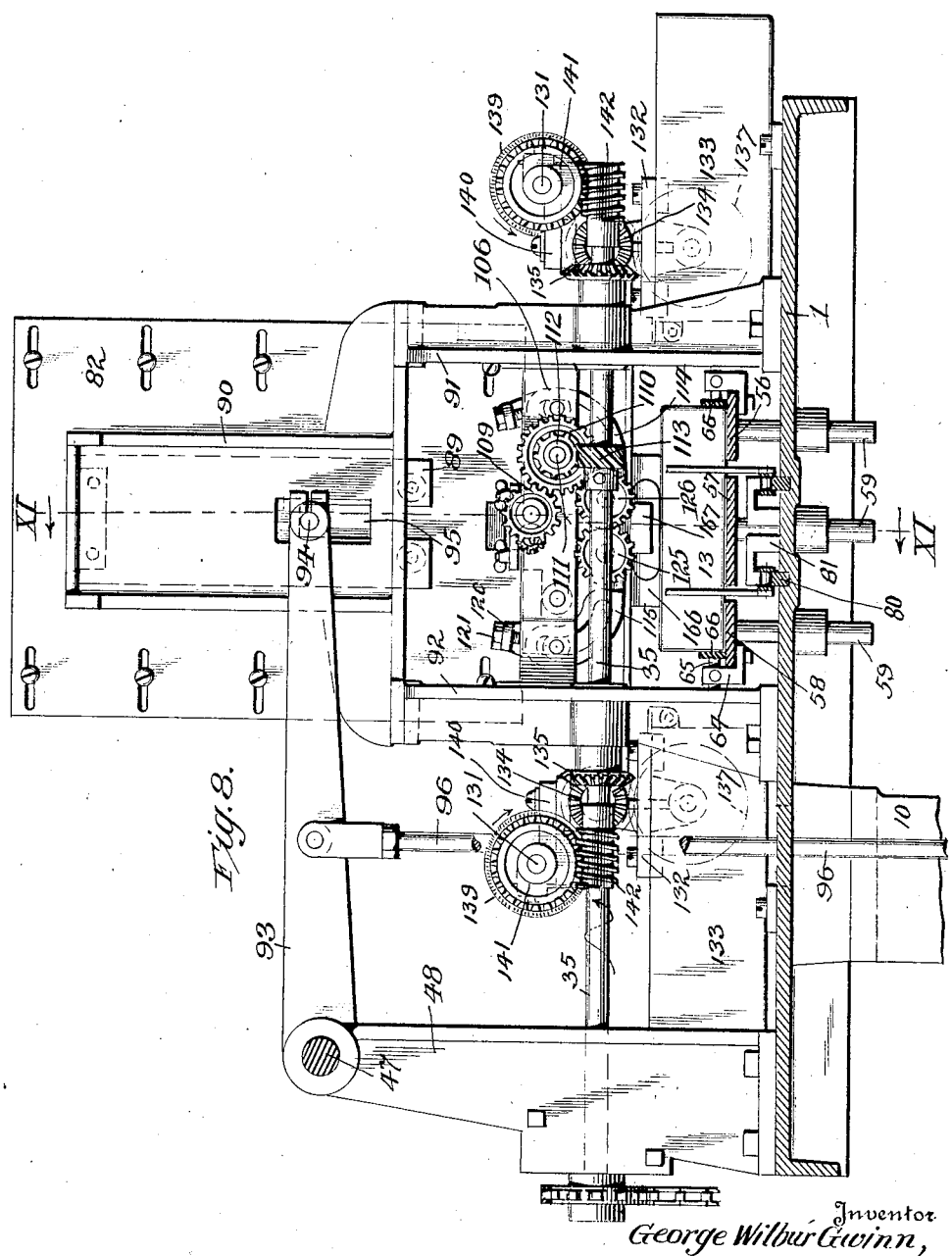

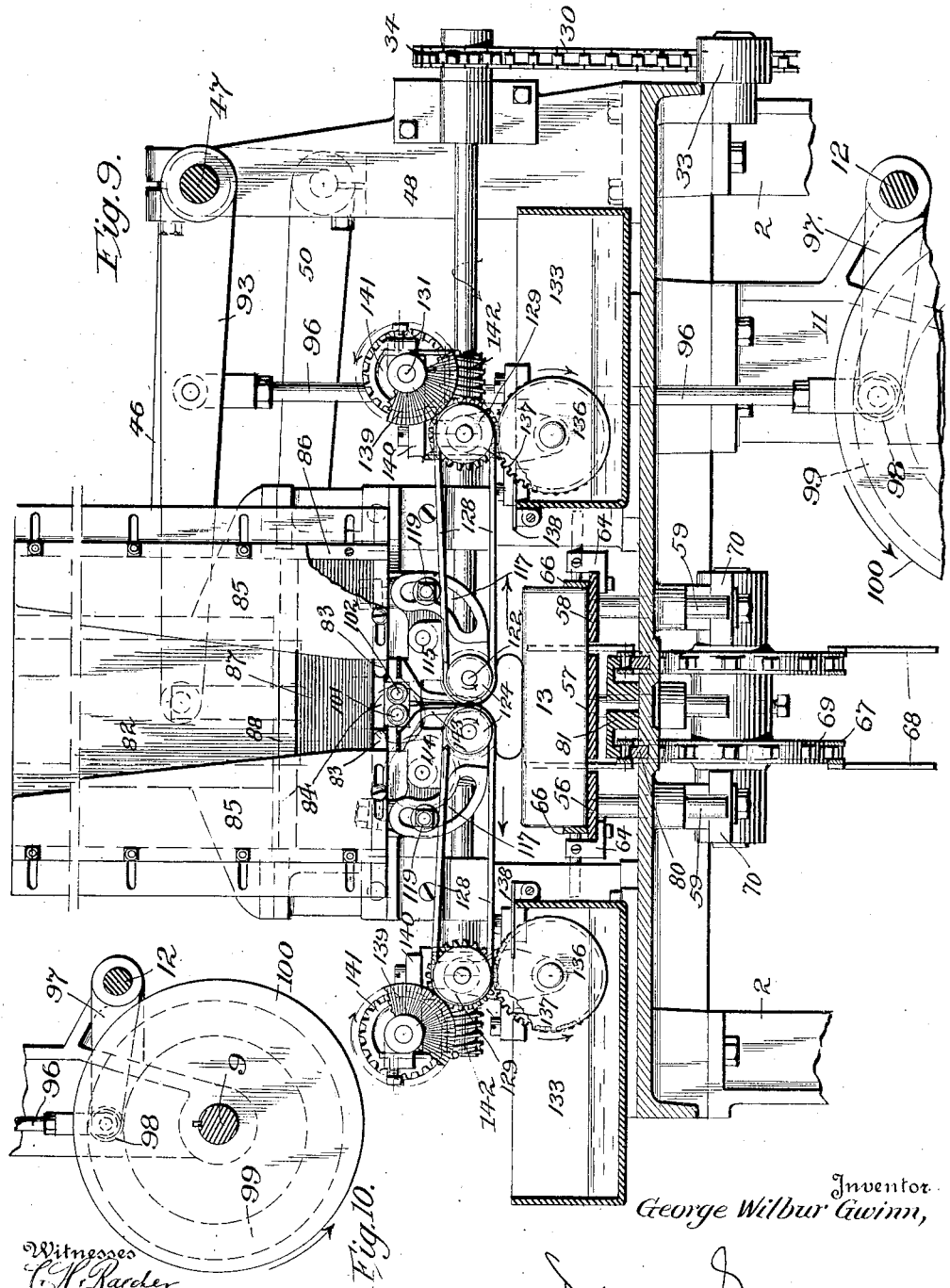

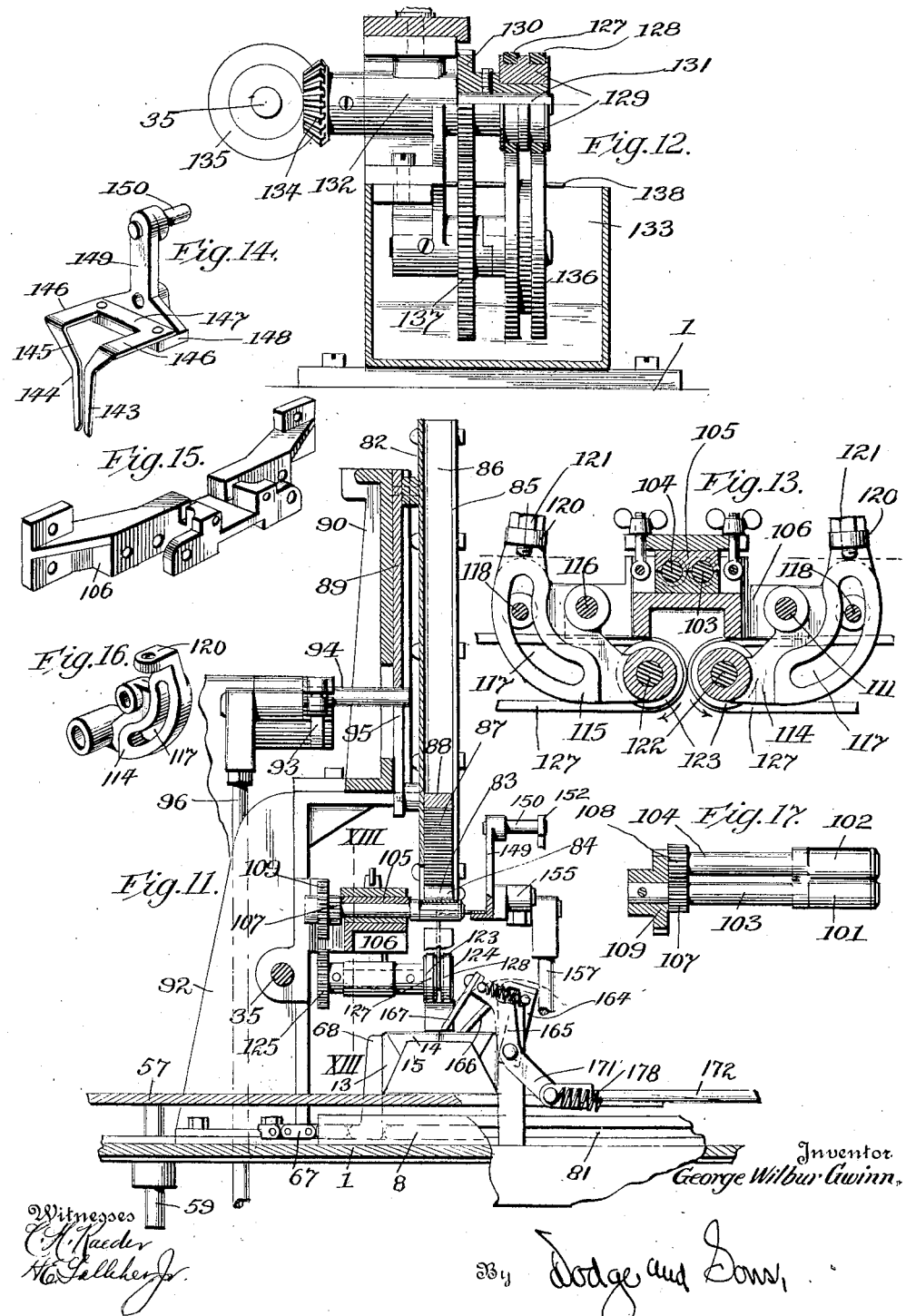

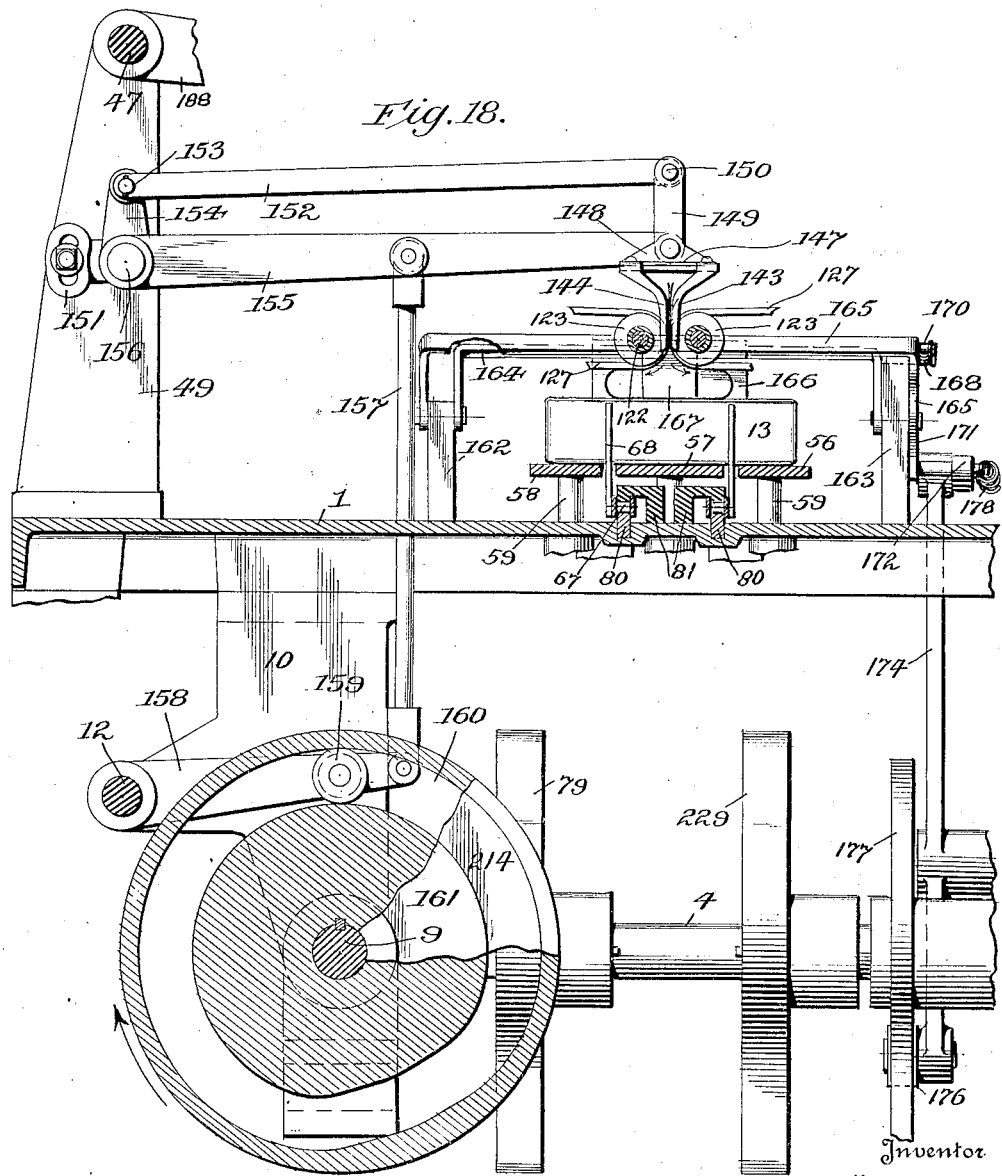

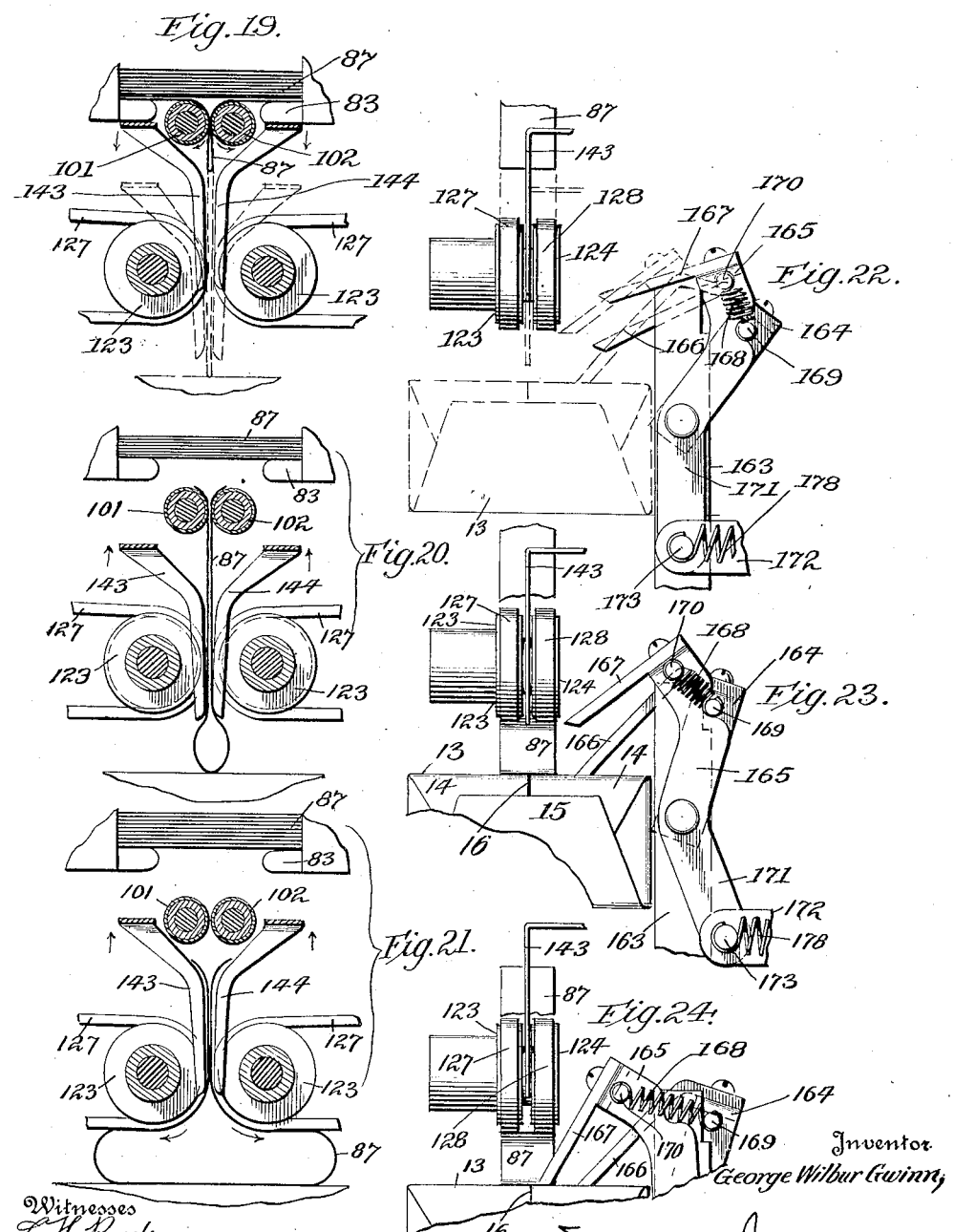

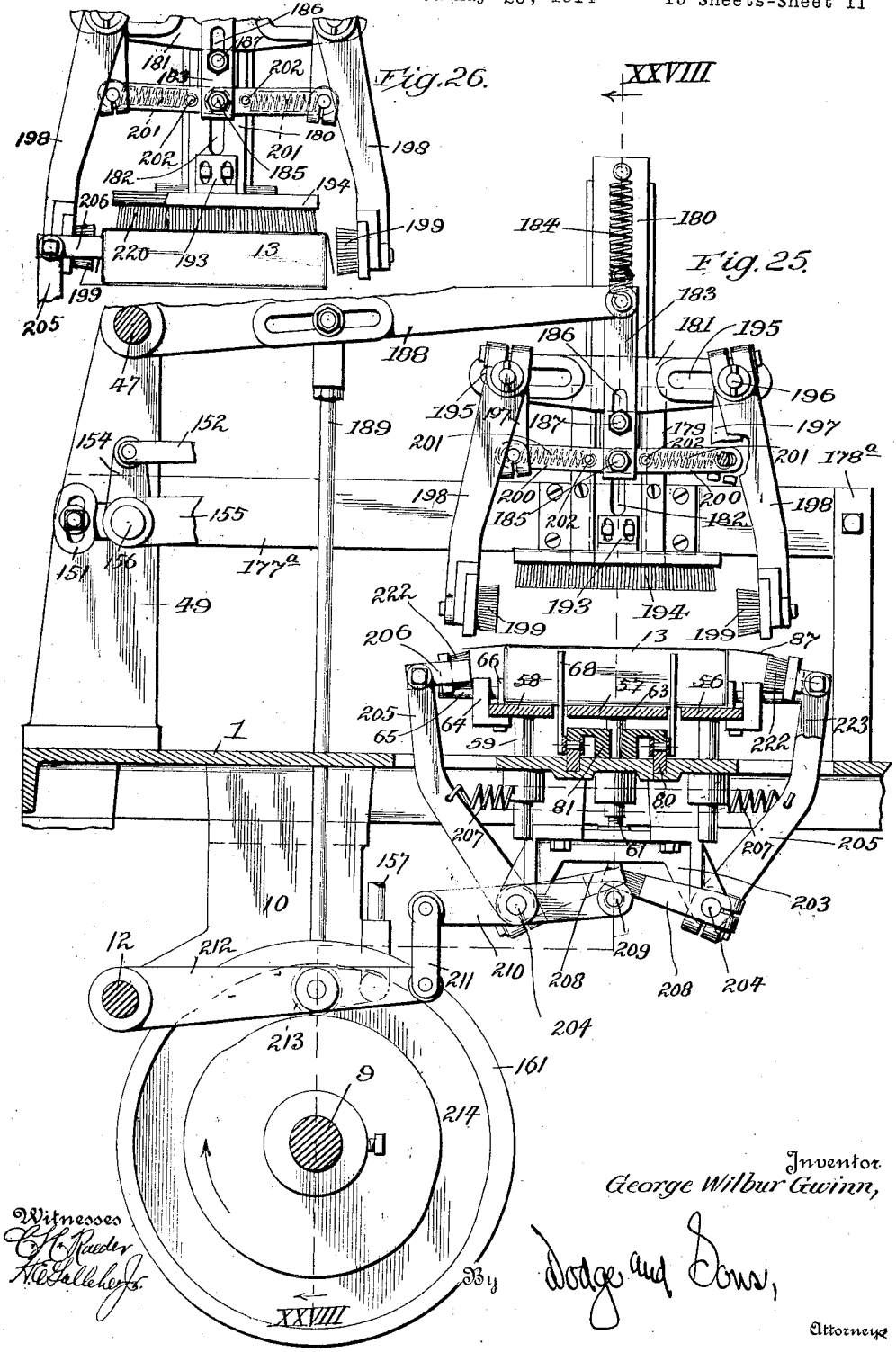
May 22, 1923.
G. W. GWINN
1,456,307
MACHINE FOR APPLYING STAMPS, LABELS, OR SEALING STRIPS TO PACKAGES
Filed May 20, 1914 15 Sheets-Sheet 11

May 22, 1923.
G. W. GWINN
1,456,307
MACHINE FOR APPLYING STAMPS, LABELS, OR SEALING STRIPS TO PACKAGES
Filed May 20, 1914    15 Sheets-Sheet 12
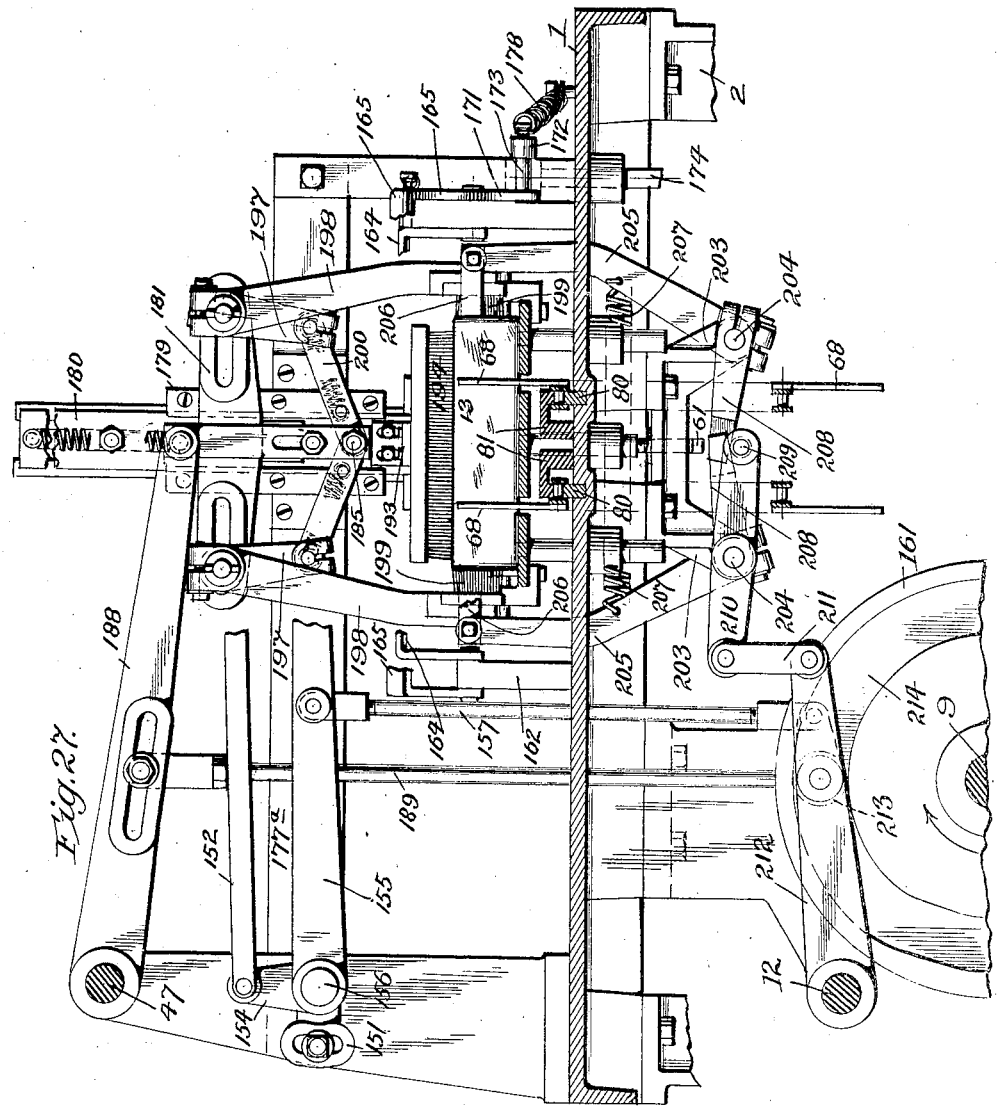
Witnesses
Inventor
George Wilbur Gwinn,
By Dodge and Sons,
Attorneys May 22, 1923.
G. W. GWINN
1,456,307
MACHINE FOR APPLYING STAMPS, LABELS, OR SEALING STRIPS TO PACKAGES
Filed May 20, 1914    15 Sheets-Sheet 13
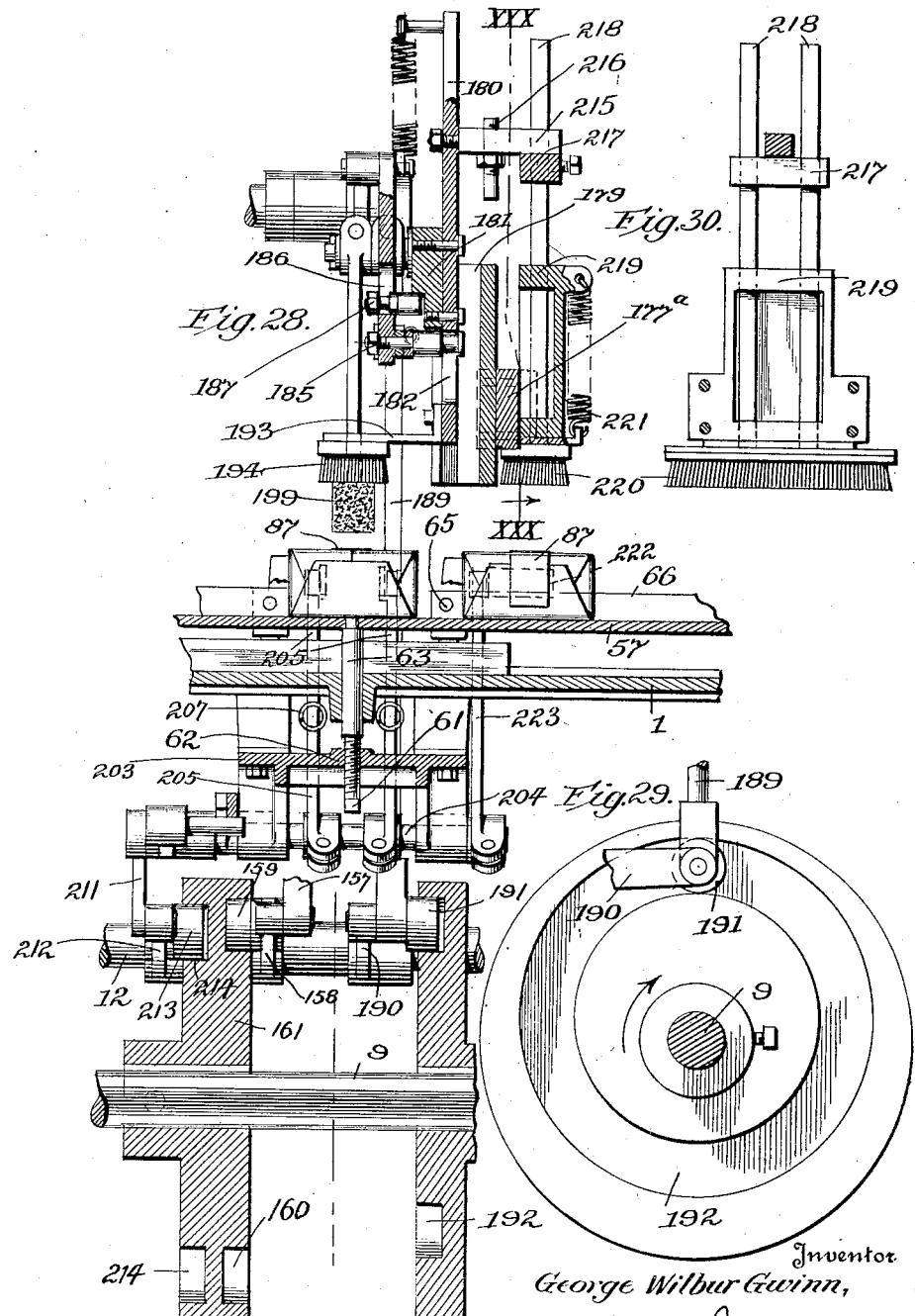

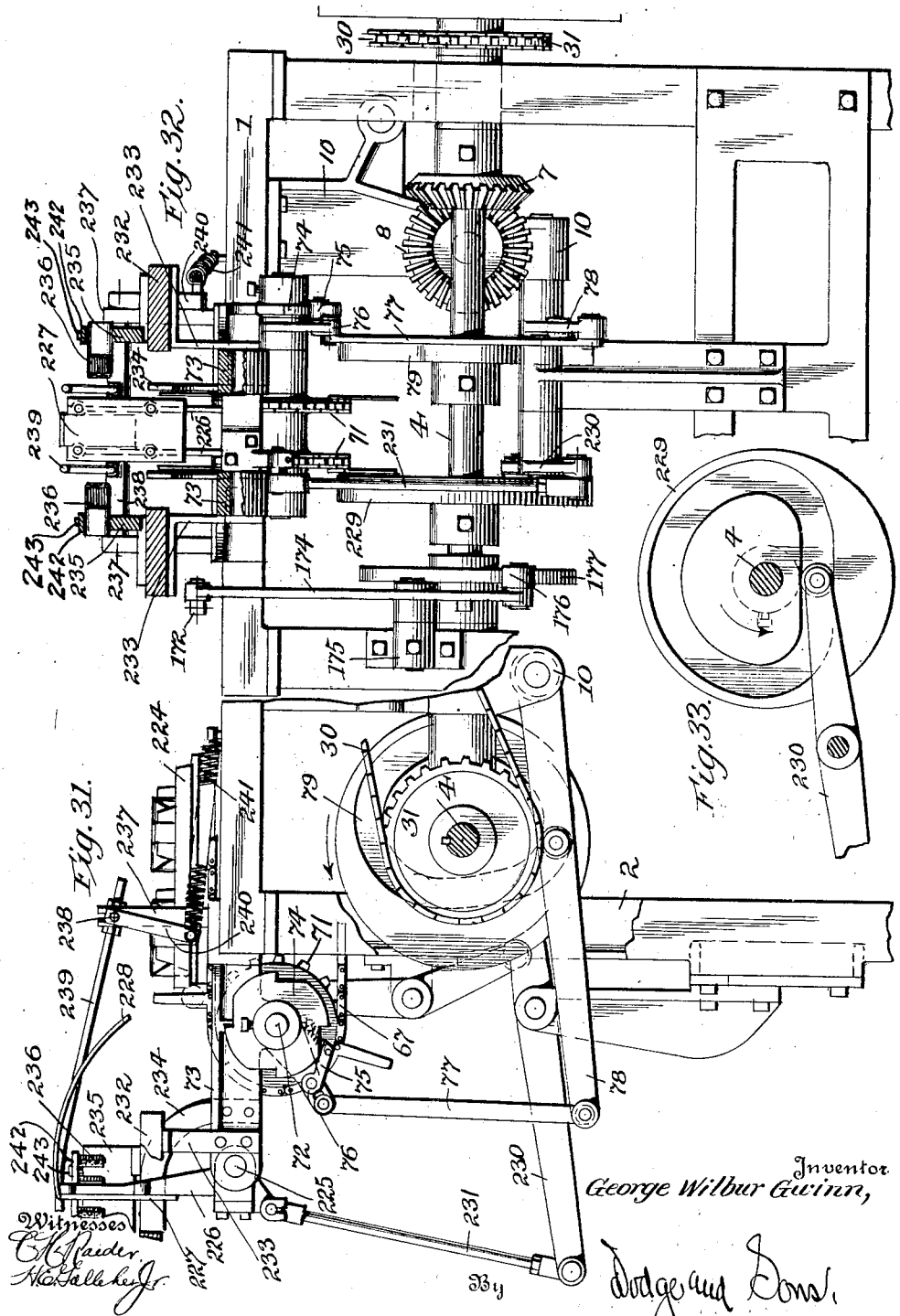

May 22, 1923.
G. W. GWINN
1,456,307
MACHINE FOR APPLYING STAMPS, LABELS, OR SEALING STRIPS TO PACKAGES
Filed May 20, 1914      15 Sheets-Sheet 15
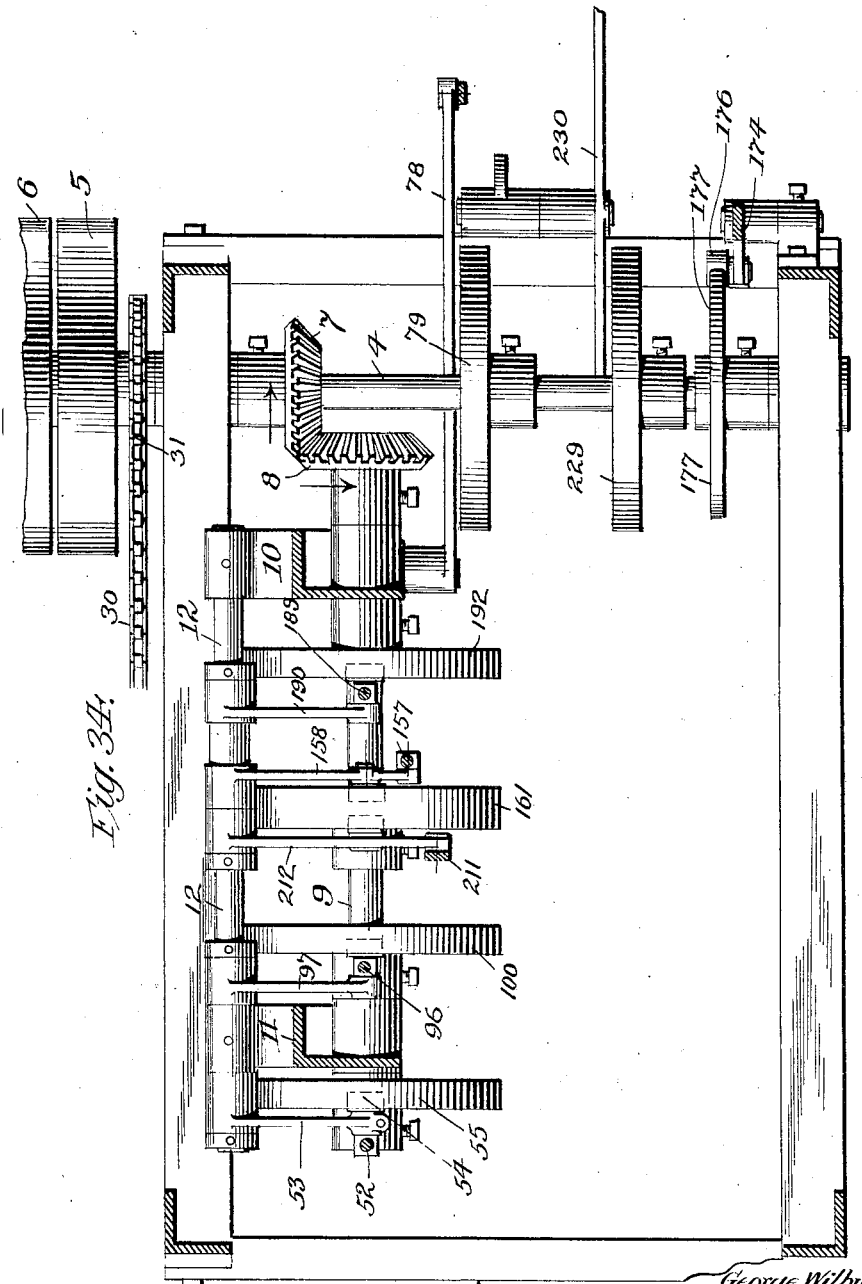
Inventor
George Wilbur Gwinn,
Witnesses
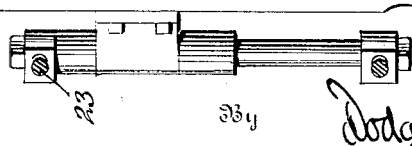
Attorneys Patented May 22, 1923.

1,456,307

UNITED STATES PATENT OFFICE.

GEORGE WILBUR GWINN, OF NEW YORK, N. Y., ASSIGNOR TO AUTOMATIC PACKING & LABELING COMPANY, OF DURHAM, NORTH CAROLINA, A CORPORATION OF NORTH CAROLINA.

MACHINE FOR APPLYING STAMPS, LABELS, OR SEALING STRIPS TO PACKAGES.

Application filed May 20, 1914. Serial No. 839,835.

*To all whom it may concern:*

Be it known that I, GEORGE W. GWINN, a citizen of the United States, residing at New York, in the county of New York and State of New York, have invented certain new and useful Improvements in Machines for Applying Stamps, Labels, or Sealing Strips to Packages, of which the following is a specification.

My present invention pertains to an improved machine for applying stamps, labels or sealing-strips to packages, the construction and advantages of which will be hereinafter set forth, reference being had to the annexed drawings, wherein:

Figure 1 is a longitudinal sectional view of the machine;

Fig. 2 a side elevation of the main portion of the machine, upon a larger scale;

Fig. 3 a horizontal sectional view, taken on the line III—III of Fig. 2;

Fig. 4, a transverse vertical sectional view, taken on the line IV—IV of Fig. 3, and illustrating more particularly the mechanism for transferring the packages from the initial feeding mechanism to the carrier which traverses the packages through the machine proper;

Fig. 5 a similar view, taken on the line V—V of Fig. 6, showing the parts in a different relation;

Fig. 6 a sectional elevation of the mechanism shown in the two preceding figures, Fig. 7 a side elevation of the cam employed to actuate the transfer plunger;

Fig. 8 a transverse vertical sectional view on the line VIII—VIII of Fig. 3, disclosing one side of the stamp magazine and allied parts;

Fig. 9 a like view taken on the line IX—IX of Fig. 3, and looking in a direction the opposite of that in Fig. 8, and disclosing the stamp-withdrawing and applying mechanism;

Fig. 10 a side elevation of the cam employed to raise and lower the magazine;

Fig. 11 a vertical longitudinal sectional view, on the line XI—XI of Fig. 8, illustrating the magazine, certain portions of the stamp-withdrawing and applying mechanism, and the hold down devices for the package fold and the stamp;

Fig. 12 a detail view of one of the paste receptacles and the paste-applying belts;

Fig. 13 a sectional view on the line XIII—XIII of Fig. 11, illustrating the manner of adjustably supporting the inner paste belt-supporting rolls;

Fig. 14 a perspective view of the stamp director which works in conjunction with the stamp-withdrawing rolls and the paste-applying belts;

Fig. 15 a perspective view of the supporting frame for said members;

Fig. 16 a like view of one of the adjustable supporting brackets for the paste belt rolls;

Fig. 17 a detail plan view of the stamp-withdrawing rolls;

Fig. 18 a sectional elevation illustrating the operative mechanism for the stamp director, and also the hold-down devices for the package fold and the stamp;

Figs. 19, 20 and 21 detail sectional views, illustrating the operation of the stamp-withdrawing rolls, the stamp director and the stamp-applying belts;

Figs. 22, 23 and 24 detail elevations showing the operation of the hold-down devices;

Fig. 25 a transverse vertical sectional view, illustrating the brushes which act upon the stamp after it has been laid across the package by the belts;

Fig. 26 a like view showing the upper brush as lowered;

Fig. 27 a view similar to Fig. 25, with all the brushes in engagement with the package;

Fig. 28 a vertical longitudinal sectional view on the line XXVIII—XXVIII of Fig. 25, showing the initial and final brush mechanisms;

Fig. 29 a detail view of one of the operating cams;

Fig. 30 a vertical sectional view on the line XXX—XXX of Fig. 28;

Fig. 31 a side elevation of the final transfer mechanism for the stamped packages as seen from the opposite side of the machine as viewed in Fig 2;

Fig. 32 a sectional elevation thereof;

Fig. 33 a detail of one of the operating cams; and

Fig. 34 a horizontal sectional view, through the base of the machine, showing the driving shafts and the main operating cams.

In the packaging of materials where a wrapper is placed about the package, it is necessary in order to hold the same closed or to seal the package, to secure the infolded ends of the wrapper and also, preferably, the longitudinal lap or seam which extends along one side of the package. In the packaging of tobacco this sealing may be advantageously accomplished by applying the revenue stamp as a sealing medium, and in the description following I shall refer to the label, strip, or stamp as a stamp, the term being employed in a generic sense.

The main objects of the present invention are to provide a carrier which may be adapted to handle packages of different sizes, to provide a simple and effective device for removing the stamps from the magazine, the stamps as they are withdrawn being folded upon themselves and while thus folded having paste applied to the then outer faces, and thereafter projecting the central folded portion against the package and causing the ends, as the stamp is unfolded, to travel in opposite directions and to be laid upon the package preferably over the longitudinal seam or lap; to provide means for holding the infolded ends of the bag, and a hold-down for the package-wrapper as the stamp is applied, together with a hold-down for the central portion of the stamp as the same is being extended along the package; to provide means for carrying the stamp ends over the inturned flaps on the package ends; to provide means for brushing or beating the stamp against the package after it is positioned thereon; to provide means for holding the stamps in place while the packages are still in the carrier; and to provide means for removing such stamped packages from the carrier and transferring them to a runway, preferably provided with means for engaging the stamp ends and preventing them from curling up and off of the package end as they dry.

With these and other objects in view, a detailed description of the invention will be given.

In the drawings, 1 denotes the bed or table, the legs 2 of which are connected by intermediate braces 3. The main driving shaft 4, carries fast and loose pulleys 5 and 6 and a bevel gear 7 which meshes with a similar gear 8 (see Fig. 34) secured to one end of a cam-carrying shaft 9, mounted in bearings supported by hangers 10 and 11, Figs. 1 and 2, secured to the under portion of the table. Said hangers also form the support for a fixed shaft or fulcrum bar 12, upon which the various actuating levers are journaled.

The packages which are to be stamped are designated as a whole by 13, having on each end inturned end flaps 14 and 15 and a longitudinally-extending lap or seam 16 on one side of the body thereof. Said packages are fed from a table or support 17, Fig. 1, beneath a rod 18, carried at the outer ends of a pair of arms 19 (Fig. 4) secured to a shaft 20 journaled in arms 21 extending upwardly from a lateral table or extension 22 supported at its outer end by a strut 23. A stop block 24 is secured to shaft 20, and a pin 25 in said block taking against the side of one of the arms 21 (Figs. 4 and 5) prevents presser rod 18 from dropping when no packages are beneath the same.

The packages pass from the table 17 onto an endless feed belt 26, the latter passing around pulleys 27 and 28 and over a bed plate 29 (Fig. 1). Pulley 28 is driven by a sprocket chain 30 which derives its motion from a sprocket wheel 31 secured to main shaft 4 (Fig. 31). Said chain passes beneath idlers 32 and 33 (Fig. 1) and about a sprocket 34 (Fig. 3) secured to a shaft 35, which actuates the stamp-handling mechanisms. Guide plates 36 and 37 are arranged along each side of the belt 26 and bear against the ends of the packages, said plates being adjustable toward and from each other to accommodate different sized packages. They are supported, as shown in Figs. 4 and 5, by arms 38 adjustably secured in arms or standards 21 and similar members 39.

Adjacent the discharge end of belt 26 and in line therewith, (see Fig. 6), there is located a fixed table 40 supported from the guide plates 36 and 37 and adapted to receive the packages as they are advanced by and discharged from the belt. Plates 36 and 37 are provided at their inner ends with adjustable stops 41, Figs. 1, 4 and 6, adapted to arrest the packages and hold the innermost package at its ends upon a pair of oppositely-disposed spring-sustained pivoted gates 42. Located above said gates and in alinement with the package sustained thereby, is a plunger 43, provided with an upstanding guard or cut-off plate 44 which, as the plunger descends to force the package below the same downwardly into the carrier mechanism, as in Figs. 5 and 6, comes in front of the next package and prevents the constantly moving feed belt 26 from forcing the same forwardly.

Plunger 43 is carried at the lower end of an arm 45, pivotally attached at its upper end to a lever 46, which is fulcrumed upon a fixed rod or bar 47, mounted in two standards 48 and 49 extending upwardly from the bed or table 1. A distance or guide link 50 is likewise connected to arm 45, its opposite end being pivotally connected to the lower end of a short arm 51, secured to rod 47. A rod 52 is connected at its upper end to lever 46, its lower end being connected to the free end of an arm 53 fulcrumed upon shaft 12. A bowl or roller 54 is secured at the point of connection of rod 52 and arm 53, said bowl working in conjunction with a cam or cam groove 55. Said groove is of such form as to hold the plunger 43 elevated most of the time, but it will cause said plunger to descend from the position shown in Figs. 1 and 2, through the position shown in Fig. 4, and finally to the position illustrated in Figs. 5 and 6. In its downward movement it will force the underlying package through the spring gates, which will immediately swing upwardly, and deposit the same upon the floor of a runway, after which the plunger will move upwardly past and free of the gates until it comes to rest preparatory to having another package moved thereunder. The floor of the runway just referred to may be said to comprise three horizontally-disposed slat-like members 56, 57 and 58, spaced apart at their adjacent edges. Said members are adjustable as to height, the members being supported by posts 59 which extend through collars 60 formed as a portion of bed 1 and clamped therein by screws. The central member 57 at its mid-length is raised or lowered through the agency of a screw 61, threaded into a bracket 62, said screw bearing against the lower end of a downwardly-extending post 63. Brackets 64 are secured at intervals to the outer edges of members 56 and 58, the upwardly projecting ends thereof having adjustably secured therein pins 65 which carry the vertically-disposed side rails 66 of the runway. From this it will be seen that the runway may be adjusted to accommodate different sized packages, being raised or lowered to bring the upper surface of the packages into proper plane, with reference to the stamp-applying mechanism and other members, and likewise by adjustment of the side rails 66, to arrange for packages of different lengths.

The means employed for traversing or advancing packages through the runway comprises a pair of sprocket chains 67 provided with a series of equally-spaced and outwardly protruding arms 68 arranged in pairs, said arms passing upwardly through the spaces or slots formed between the adjacent edges of member 57 and the members 56 and 58. Said sprocket chains pass around sprocket wheels 69, see Figs. 2, 4, 6 and 9, mounted upon a shaft carried in adjustable bearings 70, Fig. 6, secured to the table at the forward end thereof. At the opposite end of the table, see Figs. 31 and 32, the chains pass over a second pair of sprocket wheels 71, secured to a shaft 72, mounted in bearings formed upon a table extension 73. Said shaft also has secured to it a ratchet wheel 74, adapted to coact with and be actuated by a spring-pressed pawl 75, pivoted upon a rocker arm 76, loosely sleeved upon shaft 72. Said arm is actuated through the medium of a link 77 pivotally connected to said arm and similarly connected at its lower end to a lever 78 fulcrumed upon a downward extension of the adjacent hanger 10. Lever 78 carries a roller which takes in a cam 79 secured upon the main driving shaft 4. From these connections it will be seen that the chains are given a step-by-step motion and that by changing the ratchet-wheel the length of the step of the sprocket chains, hereinafter termed the feed chains, may be varied if found necessary to accommodate different width packages, though as will be seen upon reference to Fig. 2, only one pair of the arms 68 contacts with a single package and the timing of the movement of the chains is such that the packages will always come to rest under the successively operating devices employed to put the stamps thereon.

Table 1, see Figs. 1, 4, 8, 9, 11, 18, 25 and 27 will be provided with a pair of tracks 80 throughout a portion of its length, adapted to pass upwardly between the links of the feed chains, and with a second pair of overhanging tracks 81 which pass downwardly between the upper edges of the links, said tracks 80 and 81 in effect providing guideways for the feed chains as they pass beneath the stamp positioning mechanism and as a consequence the arms 68 are maintained in a vertical position and properly position the packages. The packages, after having been deposited upon the runway by the action of plunger 43 in advance of the adjacent arms 68, are fed forwardly thereon beneath the stamp magazine, thence into position to be acted upon by the successively acting brush mechanisms and finally between the plates which bear against the stamp end to the point of discharge from the table where the transfer mechanism comes into action.

The stamp magazine comprises a box-like structure, composed of a back plate 82, a bottom plate 83, having an opening 84 located centrally thereof, and two laterally adjustable front plates 85, having end plates 86 secured thereto and movable therewith so that the magazine may be adjusted for different sized labels. The labels, designated by 87, rest upon the bottom plate and are held in place by a weight 88, Figs. 9 and 11, resting thereon.

The back plate has secured to it a guide plate 89, which works in vertically-disposed ways formed in a standard 90, secured at its lower end upon uprights or brackets 91, 92 secured to bed 1. The magazine is designed to be raised and lowered to take the stamps out of operative relation with a pair of feed rolls and to lower them into contact therewith, as will be more fully explained, and to this end I employ a lever 93, fulcrumed upon rod 47, said lever at its free end carrying a pin 94, which projects outwardly therefrom and extends into a slot 95, formed in plate 89. A link or rod 96 extends downwardly from lever 93, said link being connected at its lower end to a radius-bar 97, Fig. 9, fulcrumed upon shaft 12. A roller 98, carried at the junction of said rod and bar, works in a cam groove 99, of a cam member 100 secured upon shaft 9. As will be seen upon reference to Fig. 10, the cam is of such form as to impart but a slight movement to rod 96 in either direction, as the magazine is only lowered a short distance to bring the lowermost stamp into contact with the stamp-withdrawing rolls, after which it is again elevated. Said rolls, 101 and 102, preferably rubber-covered, are placed close together and are secured upon shafts 103, 104, which have their bearings in a removable box 105, carried by a bracket 106 which in turn is secured to the uprights 91 and 92. Rolls 101 and 102 are adapted to rotate together, with the adjacent faces moving in a downward direction, and to effect this shafts 103 and 104 are provided with intermeshing gears 107 and 108, Fig. 17, shaft 103 also having secured to it a larger gear 109 which meshes with a gear 110 (Figs. 3 and 8). Gear 110 is mounted on a shaft 111, secured in bracket 106, said shaft likewise supporting a worm wheel 112, meshing with a worm 113 secured upon shaft 35. Said shaft, as heretofore indicated, is constantly driven and through the connections just set forth constant rotation is imparted to the feed rolls 101 and 102. An arm 114 is fulcrumed upon shaft 111 and a similar arm 115 is fulcrumed upon a pin or shaft 116, mounted in bracket 106. Each arm is provided with an arcuate slot 117, through which extends a screw or bolt 118, projecting outwardly from bracket 106, a nut 119 being provided to clamp the arm in its adjusted position. The upper end of each arm is formed with a lug 120, which overhangs the bracket 106, a stop-screw 121, carried by the lug and bearing on the bracket, affording means to enable one to readily effect adjustment of the arm. Rotatably mounted in the lower end of each arm is a shaft 122, each shaft in turn carrying at one end a pair of grooved wheels or pulleys 123 and 124, while secured to the opposite ends of the shafts are intermeshing pinions 125 and 126, the latter meshing with gear 110 and deriving motion therefrom. Belts 127 and 128 pass respectively around pulleys 123 and 124, said belts likewise passing about a double grooved pulley 129 (Fig. 12), said pulley rotating with a gear 130 secured to a shaft 131 which latter has its bearing in a casting 132 secured upon a paste-box or receptacle 133, mounted on bed 1. Shaft 131 carries a bevel-gear 134, which meshes with a similar gear 135 mounted on shaft 35. These parts, as indicated, are duplicated, consequently there are two pairs of endless belts which, as best seen upon reference to Figs. 10 and 11, extend in toward the center of the machine in line with the stamp which is fed downwardly by the feed rolls in a folded condition, as shown in Figs. 19 et seq.

In each of the paste boxes 133 (see Fig. 12) there is mounted a two-faced paste-applying wheel 136, the faces thereof contacting with the overlying belts 127, 128 and serving to apply paste thereto. Said wheel is driven by a gear 137 which meshes with gear 130. A scraper 138, Figs. 9 and 12, scrapes off the surplus material carried up by the sides of the wheel and gear 137, while a rotating brush 139, Figs. 3, 8 and 9, acts to remove the surplus adhesive or paste which may be applied to the belts. Said brush is secured upon a shaft having its bearing in an adjustable bracket 140 mounted upon casting 132, the shaft carrying a worm-wheel 141 which derives its motion from a worm 142 secured upon shaft 35. A scraper 138ª (Fig. 2) is provided for the brush 139, in order that it may not become clogged or stiffened.

As before noted, the stamp box or magazine is periodically raised and lowered, and when lowered feed rolls 101 and 102 come into contact with the lowermost stamp 87 and draw the same out, doubling it upon itself, and feeding it downwardly, as shown in Figs. 19 and 20, in its folded condition, between and in contact with the paste-applying belts which, while applying paste to the exposed face (or faces) also serve to carry it downwardly toward the underlying package 13. When the parts reach the positions shown in Fig. 21, the stamp ends are free of the rolls 101 and 102, and to keep the ends from flying apart, as they would naturally tend to do, and to strip the stamp from the belts, I employ a stamp stripper and guide of the form best shown in Fig. 14. It may be said to comprise two downwardly-extending, parallel fingers 143 and 144, which are relatively thin and spaced apart to permit the stamp to pass between them, said fingers being spread apart at their upper ends, as at 145, and provided with lateral extensions 146 which are connected by a cross-piece 147. Said piece is secured to a carrier 148, having an upwardly extending arm 149, said arm having mounted in its upper end a laterally projecting pin 150. A swinging bell-crank lever 151, see Figs. 3 and 18, is mounted on a supporting stud 156, secured to standard 49, a link or radius bar 152 being swiveled upon a pin 153 carried by the upwardly extending arm 154 of the lever, the opposite end of the link being connected to pin 150.

A lever 155 is swiveled upon the supporting stud 156, the opposite end thereof being pin-jointed to the finger-carrier 148. A link or rod 157 is connected to the lever 155, its lower end being connected to the outer end of a lever 158, fulcrumed on shaft 12, said lever carrying a roller 159 which works in a cam groove 160, formed in one face of a member 161 secured to the cam shaft 9.

The fingers 143 and 144, as will be seen most clearly upon reference to Figs. 19 to 24, pass downwardly between the adjacent pulleys or rolls 123 and 124, and as above noted, serve to guide or direct the folded stamp and likewise to strip it off of the belts. After the stamp has moved downwardly between the fingers and comes into contact with the paste-applying belts, the fingers move from the full-line position (Fig. 19) to the dotted line position, in said figure, and as soon as the folded portion of the stamp strikes the package the fingers begin to move up, the stamp at such time beginning to unfold as it is continuously moved down by the belts. From this point the fingers continue their upward movement (the magazine having in the meantime been raised so as to prevent the withdrawal of another stamp), until they reach the position shown in Fig. 21, at which time the stamp adhering to the belts will have its ends carried out by the under run of the belts and laid upon the upper face of the package over the seam 16, with the ends of the stamp projecting outwardly beyond the ends of the package, as indicated in Fig. 25. When this is accomplished, the sprocket feed chain 67 is advanced one step and the cycle of operations is again repeated.

In order to hold down the overlying top portion of the package as the stamp is applied, and likewise to hold the central portion of the stamp while its ends are being carried outwardly by the belts, I employ two hold-down devices best shown in Figs. 2, 3, 18, 22, 23 and 24. Extending upwardly from the bed 1 are a pair of posts 162 and 163, the latter being somewhat higher than the other. A pair of bail-shaped members 164, 165 are pivoted to the posts, Figs. 3 and 18, member 164 carrying a presser or hold-down plate 166, adapted to coact with or press upon the package while member 165 carries a similar but shorter plate 167 adapted, after the loop in the stamp is opened out to a slight extent, to pass into said loop and hold the central portion of the stamp down upon the package. Plate 166 comes into action in advance of plate 167, see Figs. 23 and 24, and to effect this I connect the two members 164, 165 together by means of a spring 168, secured to pins 169 and 170. Pin 169 extends outwardly from member 164 in line with the upper portion of post 163, which acts as a stop for the pin and consequently said member 164 and presser plate 166 when the plate comes into contact with and pushes the face of the package down to its proper position or plane.

To effect the rocking movement of the parts, an arm 171 is formed upon member 165, and a link or rod 172 is connected at one end to a pin 173, Fig. 3, carried by arm 171, said rod extending rearwardly (Fig. 2) and being connected to the upper end of a lever 174, fulcrumed upon a bracket 175. A roller 176, carried by the lower end of the lever bears against a cam 177, see Fig. 34, a spring 178, Figs. 2 and 3, secured to pin 173 and a fixed portion of the machine serving to hold the roller against the cam. The operation of these parts may be stated as follows:

Normally, the parts stand in the full-line position of Fig. 22, and when a package is fed forward and the stamp is about to be applied, rod 172 is drawn back, rocking the bail-shaped members, the two moving as one until pin 169 comes into contact with post 163, at which time presser plate 166 will have moved the overlying portion of the package-wrapper downwardly to the proper plane. Member 167, however, continues its forward movement and enters the looped portion of the stamp and presses upon the center thereof, and thus holds it so that there can be no buckling or displacement of the stamp should one pair of belts pull more strongly upon the stamp than the other pair. The pressure is maintained until the stamp is positioned, as in Fig. 26, and the package-carrier or chain is about to be moved a step forward, at which moment the parts will be swung rearwardly, through the action of cam 177, into the full-line position, in Fig. 22.

When the package, with the stamp thereon, is moved forward one step, it comes into line with the mechanism employed for wiping down the ends of the stamp against the ends of the package, and also the flap holding or tucking mechanism which pushes the flaps inwardly at such time. These parts are best shown in Figs. 2, 3, 25, 26, 27 and 28.

Secured to the standard 49 and extending laterally across the table is a bar 177$^a$, supported at its opposite end by a leg 178$^a$, said bar forming the support for a vertically-disposed fixed guide 179, in which is mounted a slide 180. Secured to the forward face of the slide is a cross-bar 181 and below said bar the slide is slotted, as at 182. A supplemental slide or sliding bar 183 is located in front of the main slide 180 and the bar 181, and is connected to the slide 180 by a spring 184 attached to pins carried by said slides. The lower end of the sliding bar 183 carries a fixed pin 185, which, as shown upon reference to Fig. 28, passes through the slot 182 and serves as a guide for said sliding bar, the bar having a movement independent of the main slide 180, as will presently appear. The sliding bar 183 is also provided with a slot 186 and a lifter pin 187 is adjustably mounted in said slot, said pin being adapted to contact with the lower edge or face of the cross-bar 181 under certain conditions or movements of the parts. The main slide 180 and supplemental slide or bar 183 are moved up and down through the action of a lever 188, pivotally connected to the upper end of the bar 183 and fulcrumed at its opposite end upon the rod 47. A draw-rod or link 189 is adjustably connected to said lever, the lower end thereof being connected to a second lever 190 (Figs. 29 and 34), fulcrumed upon the shaft 12, a roller 191 being carried at the point of connection of said lever and draw-rod and working in a cam groove 192.

Adjustably secured to the lower end of the forward face of the main slide 180 is an arm 193, the outer end of which supports a brush 194 which acts as a platen, adapted, when the parts are lowered, to contact with the upper face of the stamp which has been positioned upon the package, the brush being of a length substantially equal to the length of the underlying package.

As will be seen upon reference to Figs. 25 and 27, the cross-bar 181 is provided with a horizontally-disposed slot 195, adjacent each end thereof, and in each of said slots is adjustably secured a fulcrum pin 196. Each of said pins carries a sleeve (not shown) upon each of which sleeves is adjustably secured a lever 197 and an arm 198. Said arms extend downwardly into line with the runway for the packages and each arm at its lower end carries a brush 199, adapted to contact with the outwardly-extending ends of the stamp as the brushes are carried downwardly and to be thereafter moved inwardly against the stamp to cause said ends to adhere to the ends of the package. Pivotally attached to the lower end of each lever, through a pin and slot connection, are links 200 the adjacent inner ends of said links being fulcrumed upon the pin 185, and a spring 201 is connected to a pin 202 attached to each link, the opposite end of the spring being secured to the pin connection between the link and the lever. These springs tend to keep the parts in the positions shown in Fig. 25, with the pins at the inner ends of the slots, and this connection permits of a yielding of the brushes 199 as they are forced downwardly and inwardly against the stamp-ends.

In order to push the tucked ends or flaps of the package inwardly, so that the stamp-ends may be properly positioned, I employ a tucking or tuck-holder mechanism, which acts slightly in advance of the brushes 199. Secured to the under face of the bed is a bracket having four downwardly-depending arms 203, and in each pair of arms there is journaled a rock-shaft 204 (see Fig. 28). Secured to each of said rock-shafts between the bracket-arms is a pair of levers or arms 205, said arms extending upwardly in pairs upon each side of the package-runway, and each carrying at its upper end an inwardly-projecting finger 206 adapted, when the arms are moved inwardly through the stress of springs 207, to contact with the flaps at the ends of the package and to press the same inwardly so that the stamp-ends may be properly positioned. Said fingers 206 are spaced apart a distance sufficient to permit the brushes 199 to pass between the same.

To one end of each of the rock-shafts 204 there is secured an arm 208, the arms projecting inwardly toward and past each other and overlying a pin 209 projecting laterally from the free end of a lever 210 fulcrumed upon one of said rock-shafts 204 and connected at its opposite end through a link 211 with the lever 212, fulcrumed upon the shaft 12, said lever carrying a roller 213, working in a cam groove 214 formed in the member 161.

When the parts are in the positions shown in Fig. 25, the stamp 87 overlies the package and the ends thereof project outwardly beyond the ends of the package. Upon the rotation of the cam shaft 9 and the movement of the cam member 214, the lever 212 is moved upwardly from the position shown in Fig. 25 to that shown in Fig. 27, thereby lowering the pin 209 and permitting springs 207 to throw the arms 205 inwardly and to carry the tucker fingers 206 into contact with the tucked flaps at the ends of the package. Simultaneously with this movement, the cam 192, through the lever 190 and the draw-rod 189, moves the slides 180 and 183 downwardly, bringing the brush 194 into contact with the stamp which overlies the main body of the package. At the same time the brushes 199 contact with the outwardly-projecting ends of the stamp and tend to bend the same downwardly into alinement with the ends of the package, as best indicated in Fig. 26, the fingers 206 at that time folding the flaps inwardly. Only one finger is shown in Fig. 26, the other being omitted for the sake of clearness. When the parts reach this position, the brush 194 and the main slide 180 come to rest and slide 183 moves downwardly independently of the main slide. As a consequence, links 200 are carried from the position shown in Figs. 25 and 26 to that shown in Fig. 27, causing the levers 197 to approach each other, and as a consequence the arms 198 to swing inwardly, thereby bringing brushes 199 into close contact with the stamp-ends and said ends into like contact with the ends of the package. Upon further rotation of the cam shaft, the parts will return to their initial positions, as shown in Fig. 25, after which the packages are advanced one step along the package runway. In returning to their initial position the brushes 199 first move outwardly and then upwardly so as not to loosen the stamp-ends.

The stamps, while the paste is still moist, naturally have a tendency to curl up and consequently become loose from the package and it is, therefore, necessary to keep the requisite amount of pressure upon the stamps as they are advanced through the machine. To this end I secure to the main slide 180 an outwardly-extending arm 215 (see Figs. 28 and 30), which arm carries an adjustable stop pin 216, adapted, when the brush 194 has reached its lowest position, to contact with the upper end of the fixed guide 179, and to thus limit the descent of the parts. The arm 215 overlies a cross-bar 217 adjustably secured to two vertically-disposed rods or bars 218, said bars being slidably mounted in a casting or member 219, which is secured to the cross-bar 177ª. The bars or rods 218 have secured to their lower ends a brush 220, said brush being normally held in its elevated position through the action of a spring 221, secured to the brush and to the casting 219. Said brush is lowered simultaneously with the brush 194 and comes into contact with the label 87 which has been positioned upon the package in the manner just set forth. It contacts, as will be noted, with the upper portion of the stamp and to effect a like action upon the end of the stamp, where the curling naturally would first take place, I employ a pair of supplemental side brushes 222 (see Figs. 2, 3, 25, 27 and 28). Each of said brushes is mounted upon an arm or lever 223, secured to the outer end of one of the rock-shafts 204 and movable therewith. Thus, it will be seen that the stamp after being initially applied and wiped down by the first set of brushes, is subjected, after it has advanced one step forward, to the action of a second set of brushes. By reason of the adjustability of the parts, namely, the lifter pin 187 in its slot, the brush arms 198 and their allied parts in the slots 195, the arms 205 and 223 with reference to the rock-shaft 204 upon which they are mounted, and the brush 194, the mechanism may be adapted to packages of various sizes as to all dimensions.

As the packages are advanced along the supporting table or runway, after leaving the last set of brushes, the ends of the stamps are held in place by fixed guides or bars 224 (see Figs. 1, 2 and 31) and the packages are advanced therebetween until they come into alinement with the lifter or presser mechanism, which picks up the packages one by one and stands them on edge upon the table or runway, where they are stacked one against another and advanced between a series of brushes which contact at all times with the ends of the stamps and tend to drag the same rearwardly so as to prevent their coming loose. This mechanism is best shown in Figs. 1, 2, 31, 32 and 33. The table extension 73, hereinbefore referred to is, as will be best seen upon reference to Fig. 32, bifurcated and at the outer end there is journaled a shaft 225 to which is secured a pair of arms 226 carrying a platform 227. When said platform is in its lowest position, the inner end thereof is in alinement with the end of the table or runway upon which the packages are supported in the machine, and inasmuch as said platform 227 overlies the chain 67 the packages will be advanced onto said platform one by one. Segmental guards 228 are secured to the outer end of the platform and extend downwardly therefrom, said guards serving to prevent the movement of a package from the runway until the platform is in its lowest position. In order to rock the platform I employ a cam 229 mounted upon the shaft 4, said cam being operatively connected with the platform through a lever 230, and a link or draw-rod 231. The table upon which the packages are stacked on edge is designated by 232. But one end of the table is shown, said end being supported by arms 233, extending upwardly from the table extension 73. Curved guide plates 234 project upwardly from said table extension, terminating in line with the table 232. A side board 235 is adjustably secured at each side of the table 232, and a plurality of brushes 236 are mounted upon the boards and are adapted, as shown in Fig. 31, to contact with the ends of the stamp and hold the same against the package as the latter is advanced along the table.

As will be seen upon reference to Figs. 1, 2 and 31, the brushes 236 are removable from the side boards 235, being held in place by overlying clips 242 and screws 243, which pass through said clips and into the side boards.

A pair of arms 237 extend upwardly from the bed 1 at each side of the runway and a rod or shaft 238 is journaled in the upper ends of said arms and carries a pair of rods 239 which extend outwardly over the platform and over the forward portion of the table 232. An arm 240 (Fig. 31) is secured to the end of the shaft 238 and a spring 241 is connected to the lower end thereof and to a pin extending up from the table 1. Thus the upper ends of the rods 239 are urged downwardly toward the table 232 and serve to hold the packages against tilting or tipping as they are placed thereon by the platform 227. From the foregoing it will be seen that after the packages are moved upon the platform one by one, the platform will be swung upwardly and the packages thereon transferred to the table 232, the spring arms or rods 239, as a package comes to place, contacting therewith and serving to hold it in proper position while the platform is moved rearwardly into its horizontal position. Should there be any tendency for the package to slide upon the platform as the same is swung upwardly, the guide plates 234 will prevent its slipping downwardly to too great an extent and will insure its being properly positioned upon the table 232.

It will, of course, be understood that the cams are so formed and timed throughout the machine as to cause the various elements thereof to function in proper time and sequence.

In operation the machine is found to be highly efficient, in that it acts with rapidity and certainty and the packages are handled without injury thereto, and when ultimately discharged from the table 232 the stamps will have been properly positioned and thoroughly dried.

Having thus described my invention, what I claim is:

1. In a machine for applying stamps to packages, the combination of a table; a constantly-traveling conveyor-belt for the packages, located at one end of the table; spring-sustained gates adapted to directly receive the packages one by one from said belt; a package runway mounted upon the table, the forward end of the runway underlying the gates; means for forcing the package resting upon the gates downwardly onto the runway; means for advancing the packages along said runway; and stamp-applying means.

2. In a machine for applying stamps to packages, the combination of a table; a constantly-movable belt located adjacent one end thereof; a pair of spring-sustained gates located at the end of the run of said belt and adapted to receive the packages one by one therefrom; a package runway mounted on the table, the forward end of the runway underlying the gates; a plunger adapted to engage the package upon the gates and move the same downwardly therefrom onto the runway; a guard or cut-off member working in conjunction with said plunger to arrest the advance of the packages by the belt until the plunger and gates have resumed their normal positions; means for advancing the packages along the runway; and stamp-applying means.

3. In a machine for applying stamps to packages, the combination of a runway upon which the packages rest on one side; stamp-applying means adapted to apply a stamp to the upper face and the ends of the package; a package-receiving runway; means for transferring the stamped packages from the first-named runway to the receiving runway and placing them therein on edge; and means carried by said receiving runway, contacting with the ends of the stamp and serving to draw them against the package-ends.

4. In a machine for applying stamps to packages, the combination of a runway upon which the packages rest on one side; stamp-applying means adapted to apply a stamp upon the upper face and ends of the package; a stamped-package receiving runway, the receiving end whereof is located in a plane above that of the main runway; and transferring means adapted to receive the package from the latter, to transfer it to the receiving runway, and in the act of transference to turn the package on edge.

5. In a machine for applying stamps to packages, the combination of a package runway; a second runway adapted to receive stamped packages delivered from the first-named runway, said runways being located in different planes; means for applying stamps to the packages while in the first runway; and means for transferring the packages from the first runway to the second runway and in so doing imparting a quarter turn thereto, whereby they will be stacked on edge in said last-named runway.

6. In a machine for applying stamps to packages, the combination of a runway along which the packages are advanced; means for applying stamps to the packages as they are advanced along said runway; an oscillating platform upon which the stamped packages are discharged from the runway; a second runway located in line with the platform when the same is thrown upwardly; means for oscillating said platform; and means for maintaining the packages on edge within said second runway.

7. In a machine for applying stamps to packages, the combination of a runway along which the packages are advanced; means for applying stamps to said packages; an oscillating platform onto which the stamped packages are discharged from said runway; a second runway located in line with the platform when the same is swung upwardly; means for oscillating the platform; sector-shaped guide-plates extending downwardly from the second runway adjacent the outer edge of the platform; a pair of swinging arms overlying the forward portion of the second runway; and a spring tending to draw said arms downwardly.

8. In a machine for applying stamps to packages, the combination of a suitable support for the packages; a stamp magazine; a pair of rolls adapted to grasp the lowermost stamp adjacent its center and to withdraw the same, doubling it upon itself as it is withdrawn, and feeding it downwardly to an underlying package; and an associated paste-supplying means.

9. In a machine for applying stamps to packages, the combination of a suitable support for the packages; a stamp magazine; means for raising and lowering said magazine; a pair of constantly-rotating feed rolls located below said magazine and adapted, when the magazine is lowered, to withdraw the lowermost stamp from the magazine, doubling it upon itself and feeding it downwardly toward a package; and an associated paste-applying means.

10. In a machine for applying stamps to packages, the combination of a magazine for holding stamps; a pair of feed rolls adapted to withdraw the stamps one by one, and in the act of withdrawing to double the stamp upon itself; a director through which the doubled stamp is passed toward a package; and an associated paste-applying means.

11. In a machine for applying stamps to packages, the combination of a magazine; means for withdrawing a stamp therefrom and simultaneously folding it upon itself; means for directing the folded stamp toward and into contact with a package; and means for carrying the ends of the stamp laterally over the package.

12. In a machine for applying stamps to packages, the combination of a magazine; means for withdrawing a stamp therefrom and folding it upon itself; means for directing the folded stamp toward and into contact with a package; and paste-applying belts adapted to contact with the exposed face of the stamp as it passes downwardly into contact with the package.

13. In a machine for applying stamps to packages, the combination of a magazine; a pair of rolls located beneath the same and adapted to withdraw the lowermost stamp therefrom and to fold it upon itself; paste belts located at each side of the path of the descending stamp, said belts contacting with the stamp and serving first to apply the adhesive and then to carry the ends of the stamp outwardly over the package.

14. In a machine for applying stamps to packages, the combination of a magazine; means for withdrawing a stamp therefrom and folding the same upon itself; and means for applying paste to the exposed portions of the stamp and then carrying the ends thereof outwardly over the package.

15. In a machine for applying stamps to packages, the combination of a package-support; and means overlying a package on said support for applying paste to the exposed portions of a stamp, folded upon itself, advancing the folded portion of said stamp into contact with the package, and finally carrying the ends of the stamp outwardly over the package.

16. In a machine for applying stamps to packages, the combination of oppositely-disposed pairs of paste-applying belts; means for causing the adjacent portions of the opposite pairs to move in a downward direction; means for feeding a stamp, folded upon itself, to said belts, with the folded portion downmost; and means for stripping the folded portion of the stamp from the belts.

17. In a machine for applying stamps to packages, the combination of oppositely-disposed pairs of paste-applying belts; means for causing the adjacent portions of the opposite pairs to move in a downward direction; means for feeding a stamp, folded upon itself, to said belts; with the folded portion downmost; a device for directing said folded end in between said belts, stripping such portion from the belts, and directing it into contact with a package; and means for elevating said device, whereby the ends of the stamp will be carried outwardly by the belts over the package.

18. In a machine for applying stamps to packages, the combination of a package-support; and means for applying paste to the exposed portions of a folded stamp, thereafter causing the stamp, at its line of fold, to contact with a package, and finally unfolding the stamp from its center or line of fold and carrying the ends outwardly over the package.

19. In a machine for applying stamps to packages, the combination of a package-support; a pair of stamp-feeding rolls adapted to feed a stamp, folded upon itself, in a downward direction toward a package upon said support; oppositely-disposed pairs of paste-applying belts, the adjacent faces of the opposite pairs traveling in a downward direction and adapted to receive the folded stamp between them; and a combined director and stripper for the folded end of the stamp, movable between said belts toward and from the package.

20. In a machine for applying stamps to packages, the combination of a package-support; two pairs of oppositely-disposed, paste-applying belts arranged above the same, the adjacent portions of the pairs moving downwardly, and the belts of each pair being spaced apart; means for feeding a stamp, folded upon itself, with the folded portion downmost between said belts; and a pair of fingers movable up and down between the belts, said fingers serving to strip the folded portion of the stamp from the paste-applying belts and to direct said portion into contact with an underlying package.

21. In a machine for applying stamps to packages, the combination of a package-support; a magazine for containing stamps; means for raising and lowering the magazine; a pair of constantly-rotating feed rolls located beneath the magazine; two oppositely-disposed pairs of pulleys, located below the feed rolls, the pulleys of each pair being spaced apart laterally; an endless belt passing over each pulley; means for applying paste to the belts; means for causing the upper run of each belt to move inwardly toward the pulleys aforesaid and the lower run to move outwardly toward the end of the package; a pair of fingers spaced apart for the passage of a folded stamp therebetween; said fingers passing inwardly between the pulleys and belts; and means for raising and lowering said fingers.

22. In a machine for applying stamps to packages, the combination of a package-support; a plurality of endless paste-applying and feeding belts located above and spaced away from a package resting upon said support, the belts being arranged in opposition to each other with the lower runs thereof traveling outwardly from a medial point on the package toward the ends thereof; and means for supplying stamps, folded upon themselves, to said belts, with the folded portions downmost, whereby the exposed portions of the stamp will be supplied with paste, the central folded portion brought into contact with the package, and the ends thereafter carried outwardly over the package by the belts.

23. In a machine for applying stamps to packages, the combination of a package-support; and means for applying paste to the exterior surface of a folded stamp and unfolding it upon a package carried by the support.

24. In a machine for applying stamps to packages, the combination of a package-support; and means for applying paste to the exterior surface of a folded stamp, projecting the stamp, at the line of fold, against a package upon the support, and then carrying the stamp outwardly, over the package in opposite directions from the line of fold.

25. In a machine for applying stamps to packages, the combination of a package-support; means for applying paste to the exposed surfaces of a stamp folded upon itself, projecting the stamp, at the line of fold, against a package thereby opening up the stamp, and carrying it outwardly in both directions over the package; and means for holding the stamp upon the package after it is opened up.

26. In a machine for applying stamps to packages, the combination of a package-support; means bearing upon the upper face of a package to hold the inturned fold of the package-wrapper in place; and means for applying a stamp to said package along the margin of the fold while thus held.

27. In a machine for applying stamps to packages, the combination of a package-support; means bearing upon the face of a package to hold the inturned fold of the package-wrapper in place; means for applying a stamp thereto; and means for holding the central portion of the stamp in place while the same is extended outwardly toward each end of the package.

28. In a machine for applying stamps to packages; the combination of a package-support; means for projecting and placing a stamp, folded upon itself, against and upon a package carried by said support, the stamp first contacting with the package along the line of fold of the stamp and being thereafter carried laterally over the package toward each end thereof; means acting upon the upper face of the package to hold the inturned fold of the wrapper in place; and means bearing upon the upper face of the central portion of the stamp when said portion is opened up upon the package.

29. In a machine for applying stamps to packages, the combination of a package-support; means for projecting a folded stamp against a package upon said support, said means acting to open up the stamp, forming a loop therein, as the stamp contacts with the package; and a holder for the stamp adapted to enter the loop and to press the stamp against the package.

30. In a machine for applying stamps to packages, the combination of a package-support; two pairs of oppositely-disposed endless paste-applying and stamp-positioning belts, the lower run of said belts, lying above a package upon the support and traveling outwardly toward the ends of the package; means for feeding a stamp, folded upon itself, downwardly between the adjacent faces of the opposite pairs of belts; a device adapted to strip the folded end of the stamp from said belts and to direct it against the underlying package; a hold-down device for the inturned fold of the package; and a hold-down device for the central portion of the stamp, said device coming into action when the stamp is partially opened up.

31. In a machine for applying stamps to packages, the combination of a package-support; a magazine for holding stamps; a pair of stamp-withdrawing rolls located beneath the open end of the magazine; a pair of shafts located below said rolls, each shaft carrying a pair of pulleys; a paste-receptacle located adjacent each side of the machine; a pulley located above each of said receptacles; a pair of endless belts passing about each of said pulleys and one of the pairs of pulleys aforesaid; means for transferring paste from the receptacles to the belts; a pair of fingers spaced apart and passing inwardly between the pairs of pulleys and the belts; means for raising and lowering said fingers; means for holding down the inturned portion of a package-wrapper; and means contacting with the central portion of the stamp after it is brought into contact with the package.

32. In a machine for applying stamps to packages, the combination of a package-support; means for laying a stamp upon the upper face of a package with the ends of the stamp protruding beyond the ends of the package; means acting to hold the tucked ends or flaps of the package inwardly; and means for carrying the ends of the stamp downwardly over the package-ends.

33. In a machine for applying stamps to packages, the combination of a package-support; means for laying a stamp upon the upper face of a package with the ends of the stamps protruding beyond the ends of the package; means movable inwardly toward each end of the package to hold the tucked ends or flaps thereof in place; and means movable downwardly and then inwardly to carry the stamp-ends against the ends of the package.

34. In a machine for applying stamps to packages, the combination of a package-support; means for placing a stamp upon the upper face of a package, with the ends of the stamp projecting beyond the ends of the package; means for holding the tucked ends or flaps of the package in place; means bearing upon the body of the stamp overlying the package; and means for turning the protruding ends of the stamp downwardly and then inwardly against the package-ends.

35. In a machine for applying stamps to packages, the combination of a package-support; means for placing a stamp upon the upper face of a package carried thereby, with the ends of the stamp protruding beyond the ends of the package; a brush movable toward and adapted to press the stamp against the package; a pair of fingers movable into contact with each end of the package and acting to hold the flaps in place; and a pair of downwardly-movable and inwardly-swinging brushes adapted to carry the protruding stamp-ends downwardly and then inwardly against the package-ends.

36. In a machine for applying stamps to packages, the combination of a package-support; means for placing a stamp upon the upper face of a package resting thereon, with the ends of the stamp projecting beyond the ends of the package; an arm located at each side of the support; a pair of fingers carried by each arm; means for moving said arms and carrying the fingers into contact with the package-ends; a slide mounted above the support and in line with the package carried thereby; a brush carried by the slide and adapted, when the slide is lowered, to contact with that portion of the stamp which overlies the body of the package; a second slide movable relatively to the first slide; a pair of pivoted arms also movable with the second slide; a brush carried by each arm at its lower end; a yielding connection between said slides; means for raising and lowering said second slide; and means for throwing the arms, and consequently the brushes, inwardly when the second slide reaches its lowest position.

37. In a machine for applying stamps to packages, the combination of a package-support; means for applying a stamp to the upper face of a package carried by said support, with the ends of the stamp projecting outwardly beyond the package-ends; means for holding the package-ends in place; means for turning the ends of the stamps inwardly against the ends of the package while thus held; means for advancing the support; and a plurality of brushes adapted to thereafter act upon the stamp, to press it into close contact with the package.

38. In a machine for applying stamps to packages, the combination of means for placing a stamp upon one face thereof with the ends of the stamp projecting beyond the same; means acting to press the ends of the stamps against the package; means for yieldingly forcing said means against said ends; and a plurality of brushes adapted to thereafter co-operate with the stamp-ends to hold them in close engagement with the package.

39. In a machine for applying stamps to packages, the combination of means for positioning a stamp over the package with its ends projecting beyond the same; means for pressing the ends downwardly against the package; means for securing a relative operative movement between the package and the stamp-end pressing means; and a plurality of brushes adapted thereafter to co-operate with the stamp-ends to hold them in close engagement with the package.

40. In a machine of the class described, the combination with means for applying and affixing a gummed stamp to the top and sides of a receptacle; of a stamp-drying means to receive the stamp-bearing receptacle, said means having brushes slidably mounted in opposite sides thereof and operative to press the ends of the gummed stamp against the sides of the receptacle; and means for retaining said brushes in operative position.

41. In a machine for affixing stamps across packages, the combination of means for applying a stamp across one face of a package, with the ends of the stamp in position to engage opposite sides thereof; and brushes having means for moving them in reverse directions on axes located at opposite sides of the package and presenting surfaces operative first to brush the stamp-ends in a direction from the face of the package downwardly and against the respective sides thereof and to thereafter press the same inwardly.

42. In a machine for applying stamps to packages, the combination of means for advancing the packages step-by-step; means for applying a stamp across one face of the package with the ends of the stamp in position to engage opposite sides thereof; and brushes having means for moving them to brush the stamp ends in a direction from the face of the package downwardly and against the respective sides and then to press the same inwardly while the package is momentarily at rest.

43. In a machine of the class described, the combination of an intermittently movable conveyor carrying a plurality of package-holders; means for applying stamps successively across the tops of the packages, with the ends of the stamps engaging the sides of the packages; and a series of pairs of brushes operative upon the ends of the stamps on a plurality of packages to affix the same thereto.

44. In a machine of the class described, the combination of an intermittently movable conveyor carrying a plurality of package-holders; means for successively applying stamps across the tops of the packages, with the ends of the stamps engaging the sides of the packages; a series of platens operative to press upon the tops of the packages and the portions of the stamps thereon between the periods of movement of the conveyor and to disengage therefrom during the movements of the conveyor; and means operative to affix the ends of the stamps to the packages between the periods of movement of the conveyor.

45. In a machine of the class described, the combination of means for advancing a package; means for applying a stamp with adhesive thereon across the top of the package with the ends of the stamp engaging the sides of the package; and brushes operative upon the ends of the stamp on the package to affix the same thereto, said brushes being out of engagement with the stamped package during advancing movement thereof.

46. In a machine of the class described, the combination of means for feeding a stamp to lie longitudinally across the elongated face of a package; brushes presenting opposed faces; and means for moving said brushes downwardly and then inwardly and in reverse directions to cause their faces to act on the ends of the stamp to bend the same against the opposite sides of the package.

47. In a machine of the class described, the combination of means for feeding a stamp longitudinally across the elongated face of a package having substantially parallel opposite sides; a platen to bear on the face of the package and the intermediate portion of the stamp thereon; brushes presenting opposed faces to act on the ends of the stamp to bend the same against said opposite sides of the package; and means for moving said brushes downwardly against the projecting stamp ends and then inwardly.

48. In a machine of the class described, the combination of means for advancing packages step by step; means for feeding a stamp longitudinally across the same, with its ends protruding; a platen to press the body of the stamp upon the package; means for brushing the ends of the stamp against the package; a table onto which the stamped packages are deposited; and means associated with said table for holding the stamp ends in place.

49. In a machine of the class described, the combination of means for advancing packages step by step; means for feeding a stamp longitudinally across the same, with its ends protruding; a platen to press the body of the stamp upon the package; means for brushing the ends of the stamp against the package; a table onto which the stamped packages are deposited; and a series of brushes associated with said table to hold the stamp-ends in place.

50. In a machine of the class described, the combination of a pair of spaced endless belts running side by side; a paste reservoir; a grooved wheel extending into the reservoir and contacting said belts for applying paste thereto; a brush acting on the belts to spread and remove the surplus paste therefrom; and means for presenting the article to be pasted to said belt.

51. In a machine of the class described, the combination of a paste applying belt; a rotatable brush acting to remove the surplus paste from the belt; a scraper acting to keep the brush clean; and means for presenting the article to be pasted to said belt.

52. In a machine of the character specified, the combination of a paste reservoir; a wheel adapted to rotate therein; a pulley located above the roller; an endless belt passing about said pulley and contacting the wheel; a rotating brush bearing on the belt and acting to remove the surplus paste therefrom; a fixed scraper for the brush; and means for presenting the article to be pasted to said belt.

53. In a machine of the character specified, the combination of a pair of paste reservoirs spaced from each other; a pair of pulleys located adjacent each other at a position intermediate said reservoirs; a pulley located above each reservoir; a pair of belts extending about each of said last mentioned pulleys and likewise about the companion pulley of the adjacent pair; a grooved wheel extending into each reservoir and contacting the overlying belts; a brush contacting each pair of belts and acting to remove the surplus paste therefrom; means for rotating the pulleys, wheels and brushes; and means for presenting the article to be pasted to said belt.

54. In a machine for affixing stamps or labels to packages, in combination, means for applying labels to packages, one by one in succession, with the end portions of the labels projecting beyond the sides of the package, means for applying an adhesive to the projecting portions of the labels and for extending the projecting end portions of each label down and against the sides of each package, a receiver for thereafter collecting a plurality of the packages arranged side by side in a bank, and wipers extending along said receiver for repeatedly pressing the end portions of the labels of the packages in the bank.

55. In a machine for affixing stamps or labels to packages, in combination, means for applying labels to packages one by one in succession, with the end portions of the labels projecting beyond the sides of the package, means for applying an adhesive to the projecting portions of the labels and for extending the projecting end portions of each label down and against the sides of each package; a receiver for thereafter collecting a plurality of the packages arranged side by side in a bank, wipers extending along said receiver for repeatedly pressing the end portions of the labels of the packages in the bank, and means for feeding the packages one by one into the receiver.

56. In a machine for affixing stamps or labels to the ends of packages, in combination, means for affixing the middle portion of a label to the end wall of the package with the end portions of the label projecting beyond the package, a reciprocating crosshead movable toward and from the package, means controlled by the crosshead for pressing the affixed portion of the label on the package, means for applying an adhesive to the end portions of the label, and means actuated by the crosshead for extending the end portions of the label along the side walls of the package.

57. In a machine for affixing stamps or labels to the ends of packages, in combination, means for affixing the middle portion of the label to the end wall of the package with the end portions of the label projecting beyond the package, a reciprocating crosshead movable toward and from the package, means controlled by the crosshead for pressing the affixed portion of the label on the package, means for applying an adhesive to the end portions of the label, means actuated by the crosshead for extending the end portions of the label along the side walls of the package, and means operating thereafter to press the said end portions against the sides of the package.

58. In a machine for affixing stamps or labels to the ends of packages, in combination, means for affixing the middle portion of the label to the end wall of the package with the end portions of the label projecting beyond the package, means for repeatedly pressing the attached portion of the label on the end wall, and means for extending the unattached portions of the label along the sides of the package and affixing the same thereto.

In testimony whereof I have signed my name to this specification in the presence of two subscribing witnesses.

GEORGE WILBUR GWINN.

Witnesses:
JAMES WILLIAM LEARY,
J. W. SLAUGHTER.